United States Patent
Miura et al.

(10) Patent No.: US 7,533,848 B2
(45) Date of Patent: May 19, 2009

(54) TAPE REEL AND MAGNETIC TAPE CARTRIDGE

(75) Inventors: Motoya Miura, Ibaraki (JP); Yasuo Inugai, Ibaraki (JP); Shigeru Yasuda, Ibaraki (JP); Shihoko Takashima, Ibaraki (JP); Sadamu Kuse, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 619 days.

(21) Appl. No.: 11/194,454

(22) Filed: Aug. 2, 2005

(65) Prior Publication Data

US 2006/0027692 A1 Feb. 9, 2006

Related U.S. Application Data

(63) Continuation-in-part of application No. 11/078,418, filed on Mar. 14, 2005, now abandoned.

(30) Foreign Application Priority Data

Aug. 3, 2004 (JP) ............................. 2004-226354

(51) Int. Cl.
*B65H 75/14* (2006.01)
(52) U.S. Cl. ...................................... 242/614; 242/348
(58) Field of Classification Search ................ 242/345, 242/348, 614; 360/132
See application file for complete search history.

(56) References Cited

U.S. PATENT DOCUMENTS

| | | | |
|---|---|---|---|
| 6,729,570 B1 | 5/2004 | Murao et al. | |
| 6,758,428 B1 | 7/2004 | Hiraguchi et al. | |
| 2002/0005453 A1 | 1/2002 | Morita | |
| 2004/0091746 A1 | 5/2004 | Nakamura et al. | |

FOREIGN PATENT DOCUMENTS

| | | |
|---|---|---|
| EP | 0 588 219 A2 | 3/1994 |
| JP | 6-176532 A | 6/1994 |
| JP | 3003378 U | 8/1994 |
| JP | 6-282960 A | 10/1994 |

(Continued)

*Primary Examiner*—William A Rivera
(74) *Attorney, Agent, or Firm*—Birch, Stewart, Kolasch & Birch, LLP

(57) ABSTRACT

In a single-reel type tape cartridge of a servo tracking system in which signal recording is performed, a tape reel capable of eliminating edge projection during tape winding and achieving high recording density of a magnetic tape and a magnetic tape cartridge for housing the tape reel is provided. The tape reel is provided with a cylindrical hub around which the magnetic tape is wound and a pair of upper and lower flanges. The average value of the thickness of a reference flange that receives the tape edge of the magnetic tape during tape winding is set greater than the average value of the thickness of the opposite flange. The tape receiving surface of the reference flange is formed into an inclined surface, and three or more air escape recess portions are formed on the tape receiving surface. The depth of each air escape recess portion is set not smaller than 0.05 mm and not greater than 0.40 mm. The occupation area of all the air escape recess portions is set to 30% to 80% of the total area of the reference flange. Such tape reel is housed in a magnetic tape cartridge.

7 Claims, 10 Drawing Sheets

FOREIGN PATENT DOCUMENTS

| | | |
|---|---|---|
| JP | 9-35448 A | 2/1997 |
| JP | 2000-30401 A | 1/2000 |
| JP | 2000-243054 A | 9/2000 |
| JP | 2001-273737 A | 10/2001 |
| JP | 2002-83479 A | 3/2002 |
| JP | 2002-245745 A | 8/2002 |
| JP | 2002-269711 A | 9/2002 |

TAPE REEL AND MAGNETIC TAPE CARTRIDGE

This application is a Continuation-In-Part of co-pending Application Ser. No. 11/078,418 filed on Mar. 14, 2005, the entire contents of which are hereby incorporated by refrence and for which priority is claimed under 35 U.S.C. § 120.

BACKGROUND OF THE INVENTION

The present invention relates to tape reels applied to single-reel type magnetic tape cartridges, and, in particular, to a tape reel suitable for a magnetic tape cartridge of the so-called servo tracking system in which a servo signal is recorded in advance along a longitudinal direction of a magnetic tape, and signal recording and reproduction are performed while executing tracking control of a magnetic head array according to the servo signal, and to a magnetic tape cartridge for housing the tape reel.

Magnetic tapes have various uses for audio, video, computer data backup and so on. In the field of use for the backup tape, a magnetic tape, which has a storage capacity of not smaller than 200 GB per volume, has been commercialized in accordance with an increase in the capacity of the objective hard disk to be backed up. A backup tape of a large capacity exceeding 1 TB is scheduled in future, and the densification of the recording density will be further promoted. In order to cope with the densification of the recording density, the attempted conventional practices have been making the tape cartridge of a single reel, reducing the wavelength of the recording signal, narrowing the track pitch, adopting a servo tracking system and so on.

In the tape cartridge adopting the servo tracking system, a servo signal is recorded in advance along the longitudinal direction of the magnetic tape, and the signal recording and reproduction are performed while executing the tracking control of a magnetic head array according to the servo signal. The detailed practice includes the steps of guiding the magnetic tape by a read and write reference surface (hereinafter referred to as the read and write reference surface) of a tape guide provided for a tape drive while unwinding the magnetic tape outwardly of the main body casing at high speed, moving the magnetic head array in a direction perpendicular to the longitudinal direction (direction of run) of the tape on the basis of the servo signal of the magnetic tape, recording or reproducing a magnetic signal on a prescribed track and thereafter winding the tape at the same high speed as the unwinding speed.

As described above, in the tape system in which the recording signal has high density and the recording and reproduction of the signal are increased in speed, a phenomenon, which has posed no problem in the conventional tape system, causes a serious problem. When the magnetic tape is unwinded at high speed, one or several tape edges sometimes project from the wound tape layer due to the entrainment of air into the tape winding surface (this phenomenon being hereinafter referred to as edge projection). If the signal is recorded at high speed in the state in which the edge projection is occurring, the traceability of the magnetic tape, of which the edge has projected, to the read and write reference surface is poor, and the tracking by the servo signal cannot reliably be performed, consequently causing an output fluctuation due to the off-track error of the magnetic head array. In order to prevent the edge projection, the present invention has the tape receiving surface of the reel flange inclined toward the flange outer peripheral edge and further includes recess portions for preventing the entrainment of air, and the following prior arts are well known with regard to such reel structure.

When the magnetic tape is wound at high speed by the tape drive principally in a two-reel type magnetic tape cartridge, proposed methods have the practices of regulating the winding shape of the magnetic tape by forming an outwardly expanded spacing between the upper and lower flanges of the tape reel in order to orderly wind the magnetic tape around the tape reel (JP 2002-269711 A, Paragraph No. 0036, FIG. 2; JP 2002-83479 A, Paragraph No. 0030, FIG. 2; JP H06-282960 A, Paragraph No. 0005, FIG. 2; JP 2000-243054 A, Paragraph No. 0017, FIG. 1, etc.) and preventing the winding disorder by providing the flanges of the tape reel with air discharge paths (JP 2000-30401 A, Paragraph No. 0023, FIG. 1; JP H06-176532 A, Paragraph No. 0020, FIG. 1; JP 3003378 U, Paragraph No. 0016, FIG. 1) and so on.

JP 2002-269711 A is intended for the servo tracking system magnetic tape cartridge. There is provided a flange that serves as a reference of run in the single-reel type tape cartridge, and the spacing between the upper and lower flanges is set slightly greater than the width dimension of the magnetic tape. In JP 2000-30401 A, grooves for air discharge are alternately formed with the phase shifted in the rotational direction at each of the upper and lower flanges, and it is supposed that a two-reel type tape cartridge is described therein by a description of "handy VTR camera".

In JP H06-176532 A, recess grooves for air discharge are provided on the inner surface of either one of the upper and lower flanges radially toward the flange outer peripheral edge. In JP 3003378 U, grooves for discharging air are provided on the inner surface of either one of the upper and lower flanges, and the opening area of the grooves are set not lower than 30% of the area within a range in which the magnetic tape is wound up. The tape cartridges of JP H06-176532 A and JP 3003378 U are two-reel type tape cartridges of a helical scan system.

In JP 2002-83479 A, as an example of the actual dimensions of the inclined surface of the flange, a difference in the height of the flange position between the flange inner peripheral edge side and the flange outer peripheral edge side is set to 0.02 mm to 0.46 mm. In JP H06-282960 A, the flange surface is inclined to set the difference dimension of the spacing between the flange inner peripheral edge side and the flange outer peripheral edge side to 0.18 mm or more in the single-reel type tape cartridge, and a window is formed at only the flange surface on the upper side, by which the tape is wound biased toward the lower flange.

As described hereinbefore, in the tape cartridge of the servo tracking system, the edge projection largely influences the reliability during the signal recording and reproducing. If the signal recording and reproduction are performed in the state in which the edge projection is occurring, the traceability to the read and write reference surface of the magnetic tape is degraded, and the tracking by the servo signal cannot surely be performed, consequently causing an output fluctuation due to the off-track error of the magnetic head array. The reduction in the-output during the recording and reproduction due to the off-track error significantly appears in the case of a high recording density tape of which the recording signal has a shortened wavelength and the track pitch has a narrowed width.

The present inventors considered that the winding disorder phenomenon observed in the conventional two-reel type tape cartridge was the cause of the off-track error and examined measures against the edge projection of the magnetic tape cartridge of the servo tracking system. However, as the result of detailed examinations and inspections, the inventors discovered that the output fluctuation due to the off-track error was large as shown in FIG. 15B when the edge projection occurred even though the winding shape of the magnetic tape was good and that the output fluctuation due to the off-track error was small as shown in FIGS. 15C, 15E and 15G when the edge projection did not occur even though the winding shape was bad. That is, the inventors found that the above phenomenon was the phenomenon peculiar to the magnetic tape cartridge of the servo tracking system and was not observed in the helical scan system of the normal two-reel type tape cartridge.

It is considered that the above phenomenon is presumably ascribed to the poor traceability to the read and write reference surface of the magnetic tape during recording and reproduction in the portion where the edge. projection occurs since the magnetic tape wound around the tape reel runs at high speed, as a consequence of which the magnetic head array cannot trace the servo track and causes the off-track error and the output fluctuation.

The edge projection as described above easily occurs when a magnetic tape is wound around a tape reel in the tape cartridge manufacturing process. The above is because the winding of the magnetic tape is performed at higher speed than during normal recording and reproduction (several times to several tens of times higher than during recording and reproduction). When the edge projection occurs, the tape suffers an unrecoverable damage as in a case where the projecting tape edge comes in contact with the flanges while being transported. Therefore, the edge projection has conventionally been prevented by setting the winding speed not higher than a specified speed (e.g., smaller than 10 m/sec) in the manufacturing process, and the manufacturing cost of the tape cartridge is increased by a time required for the winding of the magnetic tape. When the magnetic tape is repetitively used by the user, i.e., when the recording and reproduction are repetitively performed by a tape drive, edge projection similar to the aforementioned one sometimes occurs although not so frequently than in the manufacturing stage.

As described above, in the case of the tape cartridge for performing signal recording in the servo tracking system, it is required to achieve the winding of the magnetic tape around the tape reel at high speed without causing the edge projection by achieving high performance and high functions of the structures and mechanisms of, for example, a winder for winding a magnetic tape around a tape reel, a tape run mechanism of a tape drive, a cartridge structure, a tape reel around which a magnetic tape is wound and so on, to which less attention has been paid in a field of the conventional two-reel tape cartridge.

SUMMARY OF THE INVENTION

An object of the present invention is to provide a tape reel and a magnetic tape cartridge suitable for achieving high recording density of a magnetic tape without causing the edge projection during winding the magnetic tape in a single-reel type magnetic tape cartridge on which the signal is recorded and reproduced in the servo tracking system.

According to the present invention, in a state in which a magnetic tape 3 is wound up around the tape reel as shown in, for example, FIG. 3, out of a pair of upper and lower flanges 8 and 9 extended around the peripheries of the upper portion and the lower portion of a cylindrical hub 7 around which the magnetic tape is wound up, the flange located on the side put in contact with the edge surface of the magnetic tape 3 is defined as a reference flange 8, and the flange located on the side opposed to the reference flange 8 is defined as an opposite flange 9. In this case, a flange of which the spacing from the magnetic tape edge surface to the flange is small as shown in FIG. 7 is also included in the reference flange 8.

The tape reel of the present invention prevents the occurrence of the edge projection during the winding of the tape basically by combining the following technical elements.

(1) The average value of the thickness of the reference flange of either the upper one or the lower one, which receives the edge of the magnetic tape, is made greater than the average value of the thickness of the opposite flange.

(2) An inclined surface, which is inclined from the flange inner peripheral edge toward the flange outer peripheral edge, is provided at least on the tape receiving surface of the reference flange.

The magnetic tape is consistently wound along the flange inner surface of the reference flange by the technical elements (1) and (2).

(3) A specific recess portion is provided on the tape receiving surface of the reference flange. By this, the air discharge during high-speed winding of the magnetic tape is effectively performed.

In more concrete description, the tape reel 2 of the present invention is used for the single-reel type magnetic tape cartridge applied to the servo tracking system in which the signal recording and reproduction are performed while executing tracking control of a magnetic head array according to a servo signal recorded in advance along the longitudinal direction of the magnetic tape 3. The tape reel 2 includes a cylindrical hub 7 for winding up the magnetic tape 3 and a pair of upper and lower flanges 8 and 9 extended around the peripheries of the upper and lower portions of the hub 7. The flanges 8, 9 are composed of the reference flange 8 that receives either the upper or lower tape edge of the magnetic tape 3 during the winding of the tape and serves as a winding position reference in the vertical direction and the opposite flange 9 opposed to the reference flange 8, the average value of the thickness of the reference flange 8 is made greater than the average value of the thickness of the opposite flange 9. At least on the tape receiving surface 12 side of the reference flange 8 out of the reference flange 8 and the opposite flange 9 is formed the inclined surface that is inclined from the flange inner peripheral edge toward the flange outer peripheral edge, so that the spacing between both the flanges is maximized at the flange outer peripheral edge. In order to discharge the air that intrudes between the tape layers during the winding of the tape, recess portions 13 are formed on the tape receiving surface 12 of the reference flange 8. (Herein, "the recess portion" is referred to an element having a function of air discharge, fitly referred to as air escape recess portion hereinafter.) The depth of the air escape recess portion 13 is preferably not smaller than 0.05 mm and not greater than 0.40 mm. Further, the occupation area of the air escape recess portion 13 is preferably not lower than 30% and not higher than 80% of the total area of the reference flange 8 (claim 1). (hereinafter, the area of the air escape recess portions occupied in the total area of the flange is referred to as the occupation area.)

The depth of the air escape recess portion 13 (hereinafter, fitly referred to as a recess depth) can be more preferably not smaller than 0.08 mm and not greater than 0.40 mm. The occupation area of the air escape recess portion 13 should preferably be set not lower than 35% and not higher than 70%, and the occupation area of the air escape recess portion 13 should more preferably be set not lower than 40% and not higher than 60%. In the most preferable form, the recess depth is set not smaller than 0.10 mm and not greater than 0.40 mm, and the occupation area of the air escape recess portion 13 is set not lower than 45% and not higher than 55%.

A difference between a spacing H1 between the reference flange 8 and the opposite flange 9 at the inner peripheral edge of the reference flange 8 and the width dimension of the magnetic tape 3 (e.g., 12.65 mm in the case of a magnetic tape of ½-inches) is preferably not smaller than 0.06 mm and not greater than 0.30 mm. The degree of inclination (dimension "a" of FIG. 5) of the tape receiving surface 12 of the reference flange 8 is preferably not smaller than 0.05 mm and not greater than 0.25 mm (claim 2).

A difference between the spacing H1 between the reference flange 8 and the opposite flange 9 at the inner peripheral edge of the reference flange 8 and the widthwise dimension of the magnetic tape 3 should more preferably be not smaller than 0.06 mm and not greater than 0.20 mm and most preferably be not smaller than 0.08 mm and not greater than 0.16 mm. The degree of inclination (dimension "a" of FIG. 5) of the tape receiving surface 12 of the reference flange 8 is more preferably not smaller than 0.08 mm and not greater than 0.22 mm.

It is desired that the average value of the thickness of the reference flange 8 (portions other than the air escape recess portions 13) is preferably a great value of not smaller than 0.02 mm and not greater than 0.25 mm above the average value of the thickness (portion provided with no recess portion) of the opposite flange 9 (claim 3). With regard to this point, the preferable range of the thickness should is not smaller than 0.02 mm and not greater than 0.22 mm and the more preferable range of the thickness should be not smaller than 0.02 mm and not greater than 0.20 mm. The most preferable range of the thickness should be not smaller than 0.03 mm and not greater than 0.18 mm.

An inclined surface, which is inclined from the flange inner peripheral edge toward the flange outer peripheral edge, is formed on the confronting surfaces of the reference flange 8 and the opposite flange 9. A spacing H2 between both the flanges 8 and 9 at the flange outer peripheral edge should be preferably greater than the spacing H1 between both the flanges 8 and 9 at the flange inner peripheral edge within a range not smaller than 0.10 mm and not greater than 0.45 mm (claim 4). That is, there is preferably the relation: H2−H1=a+b=0.10 to 0.45 mm in FIG. 5.

the reference flange 8 and the opposite flange 9 may have thicknesses essentially equal to each other from the flange inner peripheral edge over to the flange outer peripheral edge (claim 5). Herein, "essentially equal" means that they are equal to each other within a range of design tolerance (generally, less than ±0.02 mm).

the reference flange 8 and the opposite flange 9 may have outer flange surfaces essentially parallel to each other (claim 6). Herein, "essentially parallel" means that they are parallel to each other within a range of design tolerance (generally, less than ±0.05 mm).

It is noted that no recess portion (including a groove) is preferably provided in principle on the inner surface side of the opposite flange 9 from the viewpoint of cost reduction and preventing the edge projection. However, a recess portion or recess portions can be provided if there is a special reason for the design, operability, rotational stability or the like. Even in the above case, the entire recess portion area should preferably be made lower than 10% of the total area of the flange surface of the opposite flange 9. More preferably, the entire recess portion area is not less than 0% (no recess) and not more than 5%. As described above, if the occupation area of the recess portions formed on the opposite flange 9 is restricted below a specified value, it is allowed to cause no edge projection in winding the magnetic tape 3 around the tape reel 2 during manufacturing and so on, to orderly wind the magnetic tape 3 along the reference flange 8 and to eliminate the off-track error during recording and reproduction.

A magnetic tape cartridge housing the tape reel according to claim 1 through claim 6 results in reducing the off-truck during recording and reproduction and reducing the output fluctuation due to occurring no edge projection.

In the tape reel 2 of the present invention, the average value of the thickness of the reference flange 8 is greater than the average value of the thickness of opposite flange 9. Therefore, a tape receiving surface of the reference flange is located at a more inner side of the tape reel so that a clearance spacing between the reference flange and the tape edge become smaller. Therefore, the magnetic tape 3 can be orderly wound along the reference flange 8 consistently reliably.

Moreover, if the tape receiving surface 12 is formed into the inclined surface, the magnetic tape 3 can be wound along the tape receiving surface 12 only by applying a slight external force directed toward the reference flange 8 side to the magnetic tape 3 or by shifting and guiding the magnetic tape to the vertical center at the outer peripheral edges of the upper and lower flanges with, for example, the tape guide provided for the tape drive. It is also possible to reliably prevent the magnetic tape 3 from floating away from the tape receiving surface 12 due to the influence of a slight external disturbance.

A greater pressure is applied to the reference flange 8 in the state in which the magnetic tape 3 is wound up, and therefore, a greater flange strength than that of the opposite flange 9 is needed. Furthermore, since the flange strength is reduced when the air escape recess portions 13 are provided for the reference flange 8, more attention must be paid to the flange strength. Generally, in order to improve the strength of the reference flange 8, it is proper to make the reference flange 8 of a formation material whose strength is higher than the formation material of the opposite flange 9 or thicken the flange thickness of the reference flange 8 or concurrently use both of them.

There is an usual tendency that the hub 7 of the tape reel 2 is tighten during tape winding and the spacing between both the flanges 8 and 9 becomes narrower as the winding of the magnetic tape 3 advances. In this regard, if the spacing between the reference flange 8 and the opposite flange 9 is maximized at the outer peripheral edge of the flange, a proper margin space is secured between the opposite flange 8 and the wound tape layer, and the contact of the opposite flange 9 with the wound tape layer can be avoided. If the inclination angle of the tape receiving surface 12 is greater than necessary, the strength of the flange outer peripheral edge side is easily reduced when the inclined surface is provided by gradually changing the flange thickness.

The air escape recess portions 13 are formed on the tape receiving surface 12 of the reference flange 8 because the intruding air is discharged also from the opposite flange 9 side when the opposite flange 9 is provided with a groove or a recess portion that has an air discharge function equivalent or superior to that of the reference flange 8, and the magnetic tape 3 is moved to the opposite flange 9 side in accordance with this, causing edge projection, which is to be prevented.

The depth of the air escape recess portion is within a preferable range of not smaller than 0.05 mm and not greater than 0.40 mm because it is difficult to effectively perform air discharge if the recess portion depth is smaller than 0.05 mm. Moreover, since the air discharge operation is saturated when the recess portion depth exceeds 0.40 mm, there is no need to form the recess portion any deeper, and the strength of the reference flange 8 is reduced.

The occupation area of the air escape recess portion 13 is within a preferable range of not lower than 30% and not higher than 80% of the total area of the reference flange 8 because the air discharge function cannot sufficiently be produced when the occupation area of the air escape recess portions 13 is lower than 30%. Moreover, if the area of the air escape recess portions 13 is excessively increased when the occupation area of the air escape recess portions 13 exceeds 80%, there is provided a form as if ribs were formed on the tape receiving surface 12 rather than the provision of the recess portions, and this easily damages the tape edge (claim 1).

A difference between the spacing H1 between the reference flange 8 and the opposite flange 9 at the inner peripheral edge of the reference flange 8 and the widthwise dimension of the magnetic tape is preferably not smaller than 0.06 mm and not greater than 0.30 mm because the tape edge is easily damaged during high-speed winding of the magnetic tape 3 around the tape reel 2 during manufacturing and so on when the difference is smaller than 0.06 mm, and the edge projection easily occurs during high-speed winding of the magnetic tape 3 around the tape reel 2 during manufacturing and so on when the difference exceeds 0.30 mm.

The degree of inclination (dimension "a") of the tape receiving surface 12 of the reference flange 8 is preferably not smaller than 0.05 mm and not greater than 0.25 mm because the tape edge is sometimes damaged by coming in contact with the flange and the output fluctuation is increased when The degree of inclination is smaller than 0.05 mm, and the orderly winding effect becomes hard to obtain when The degree of inclination exceeds 0.25 mm in FIG. 5 (claim 2).

The average value of the thickness of the reference flange 8 preferably is a great value of not smaller than 0.02 mm and not greater than 0.25 mm above the average value of the thickness of the opposite flange 9 because the force for running the magnetic tape 3 along the reference flange 8 side is weakened, and a deformation accompanying the winding of the tape is occasionally increased as a consequence of a reduction in the flange strength of the reference flange 8 when the difference dimension between the average values of the thicknesses of both the flanges 8 and 9 is smaller than 0.02 mm. Moreover, because, when the difference dimension between the average values of the thicknesses of both the flanges 8 and 9 exceeds 0.25 mm, it is concerned that the tape edge might be damaged as a consequence of an excessive increase in the force for running the magnetic tape 3 along the reference flange 8 side, and the material cost is increased. Furthermore, it is also concerned that the tape reel 2 becomes unable to be accommodated in the main body casing 1 (claim 3).

When the inclined surface, which is inclined from the flange inner peripheral edge toward the flange outer peripheral edge, is formed on the confronting surfaces of the reference flange 8 and the opposite flange 9, it is preferable because the magnetic tape 3 and the opposite flange 9 can be prevented from coming in direct contact with each other due to the rotational sway of the tape reel 2 during high-speed winding and magnetic recording and reproduction of the magnetic tape 3 during manufacturing, the sway of the flange during transportation or magnetic recording and reproduction and so on.

The spacing H2 between both the flanges 8 and 9 at the flange outer peripheral edge is preferably greater than the spacing H1 between both the flanges at the flange inner peripheral edge within the range of not smaller than 0.10 mm and not greater than 0.45 mm in the case of the tape reel where the confronting surfaces of the reference flange 8 and the opposite flange 9 are formed into the inclined surfaces for the following reasons. It is sometimes the case where the tape comes in contact with the flange by receiving the influences of the deviation of the reel stand and the deviation of the flange, and the edge is damaged possibly causing the output fluctuation when the difference dimension of the spacing is smaller than 0.10 mm, and the orderly winding effect becomes hard to obtain when the difference dimension of the spacing exceeds 0.45 mm (claim 4).

The flange strength can be sufficiently increased when the thicknesses of the reference flange 8 and the opposite flange 9 are essentially equal to each other from the flange inner peripheral edge over to the flange outer peripheral edge, and therefore, the degrees of freedom of design in designing the flange structure can be improved (claim 5).

When the outer flange surfaces of the reference flange 8 and the opposite flange 9 are formed essentially parallel to each other, the rotational sway and so on of the tape reel can be satisfactorily pre vented (claim 6).

As described above, according to the present invention, the air escape recess portions 13 are provided on the tape receiving surface 12 of the reference flange 8, and the flange thickness, the spacing between both the flanges at the flange inner peripheral edge, the degree of inclination of the tape receiving surface 12 and so on are within the preferable ranges. Therefore, even when the magnetic tape 3 is wound at high speed (e.g., not lower than 20 m/sec) around the single-reel type tape cartridge, the winding can be achieved without causing the edge projection. As a result, it becomes possible to achieve faithful tracking of the servo track by preventing the magnetic head from causing an off-track error during recording and reproduction and obtain stable input and output data. A tape reel suitable for the magnetic tape cartridge of the servo tracking system capable of coping with an increase in the recording density and a magnetic tape cartridge for housing the tape reel are obtained.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Figure 1:
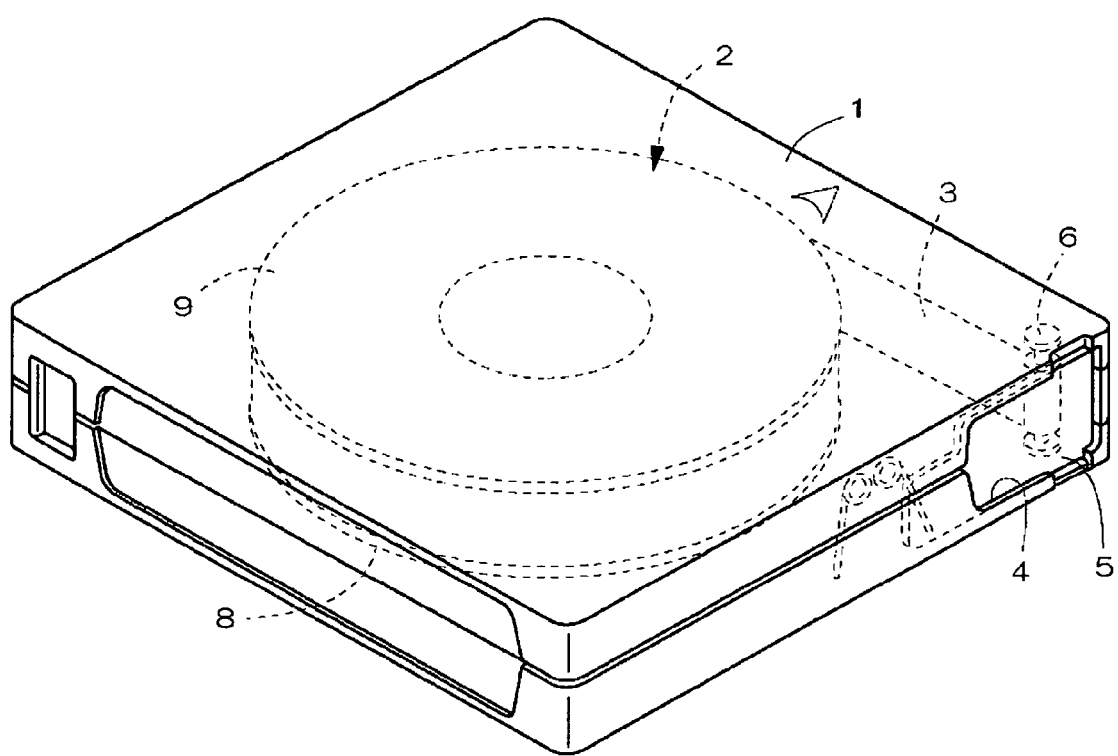
FIG. 1 is a perspective view of a magnetic tape cartridge.

Before describing the embodiments, the concept of the reference flange of the present invention is described. In general, in the two-reel type magnetic tape cartridge, the tape reel is transparently formed from the viewpoint of design. Moreover, the main body is provided with a large transparent window, allowing the magnetic tape to be viewed from outside the outer casing. Therefore, the magnetic tape needs to be wound up without winding disorder. Accordingly, by winding up the magnetic tape not at the vertical center of the tape reel in the main body casing but along either one of the flanges, the winding shape is put in order for the improvement of the design. It is noted that, in the two-reel type, it is often the case where the magnetic tape is wound up along the lower flange of the tape reel by normally utilizing the force of gravity.

On the other hand, in the case of the single-reel type magnetic tape cartridge, the reel and the main body casing are formed of an opaque material, and the main body casing is provided with no transparent window. Therefore, the winding shape itself does not much matter in terms of design.

Which of the upper and lower flanges the magnetic tape is wound along as a reference in the single-reel type tape cartridge depends on the drive standard according to the design of the drive run system, while depending on the habit of the magnetic tape. In other words, depending on the drive standard, there is a system in which the magnetic tape is wound using the upper flange as a reference and there is a system in which the lower flange is used as a reference. In consideration of measures on the edge projection, it is important to mainly consider the flange on the side that serves as a positional reference as described above.

The edge projection in winding the magnetic tape around a cylindrical hub at high speed occurs as follows. In winding the magnetic tape around the hub of the tape reel, air intrudes more easily between the tape layers at the winding portion as the winding speed becomes higher. If the intruding air is not smoothly discharged, the tape is wound with air intruding into a space surrounded by the layers of the wound magnetic tape and the reference flange, and the air is discharged toward a space formed between the edge surface of the wound magnetic tape and the opposite flange in a place where a regulating force by the guide does not operate. In this case, the magnetic tape also concurrently projects toward the opposite flange, causing edge projection.

Therefore, the edge projection can be prevented by discharging the intruding air toward the reference flange side instead of entrapping the air intruding in the space surrounded by the layers of the wound magnetic tape and the reference flange. Moreover, if the flange surface of the reference flange is inclined, the intruding air can be discharged more effectively, and the edge projection can be more reliably prevented.

In summary, it is effective (1) to optimize the thicknesses of the reference flange and the opposite flange, (2) to incline the flange surface of the reference flange, (3) to provide a specific recess portion (including a groove) on the inner surface side of the reference flange and so on in order to prevent the edge projection. By so doing, it becomes possible to effectively discharge the intruding air from the recess portion and prevent the occurrence of the edge projection. The winding shape is, of course, improved.

In order to wind up the magnetic tape along the reference flange, it is effective to make the magnetic tape easy to lie along the reference flange by locating the tape receiving surface of the reference flange more inside the tape reel and reducing the clearance spacing between the reference flange and the tape edge by making the average value of the thickness of the reference flange greater than the average value of the thickness of the opposite flange.

Since the magnetic tape is wound almost along the reference flange, a greater tape pressure is applied to the reference flange, and a flange strength greater than that of the opposite flange becomes necessary. The flange strength is reduced particularly when the reference flange is provided with a recess portion (including a groove) for discharging air, and therefore, it is necessary to pay more attention to the flange strength.

The recess portion provided for the reference flange is allowed to be freely set in shape, amount and so on and only required to produce an air discharge function. Since the reference flange is a body of rotation, it is needless to say that the recess portion should be provided with well balance. In general, a sectoral shape such that the recess width expands from the inner peripheral edge side toward the outer peripheral edge side or a rectangular shape of the same recess width can be adopted. When the magnetic tape is wound around the tape reel, there is a tendency that an air discharge efficiency is reduced due to an increase in the radius of curvature of the tape winding portion as the tape winding diameter becomes greater. In order to make air discharge sufficient by supplementing this, the recess portion should preferably have a sectoral shape such that the recess width expands from the inner peripheral edge side toward the outer peripheral edge side. Forming the tape receiving surface of an inclined surface also has operation to effectively perform air discharge in the portion of which the radius of curvature is increased.

Figure 6:
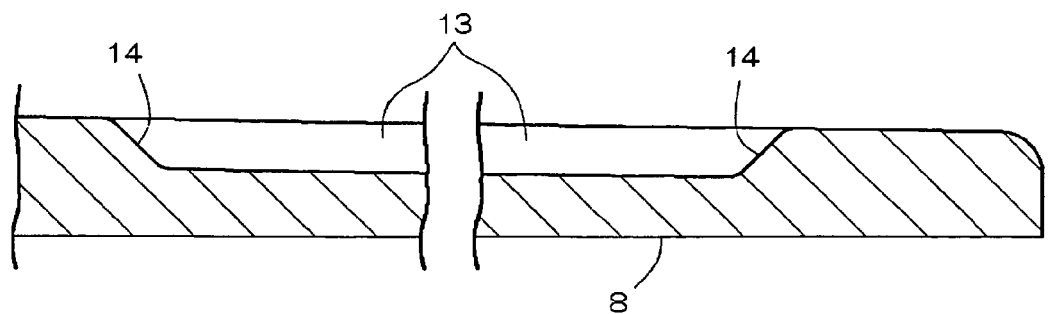
FIG. 6 is a sectional view of a reference flange.
Figure 7:
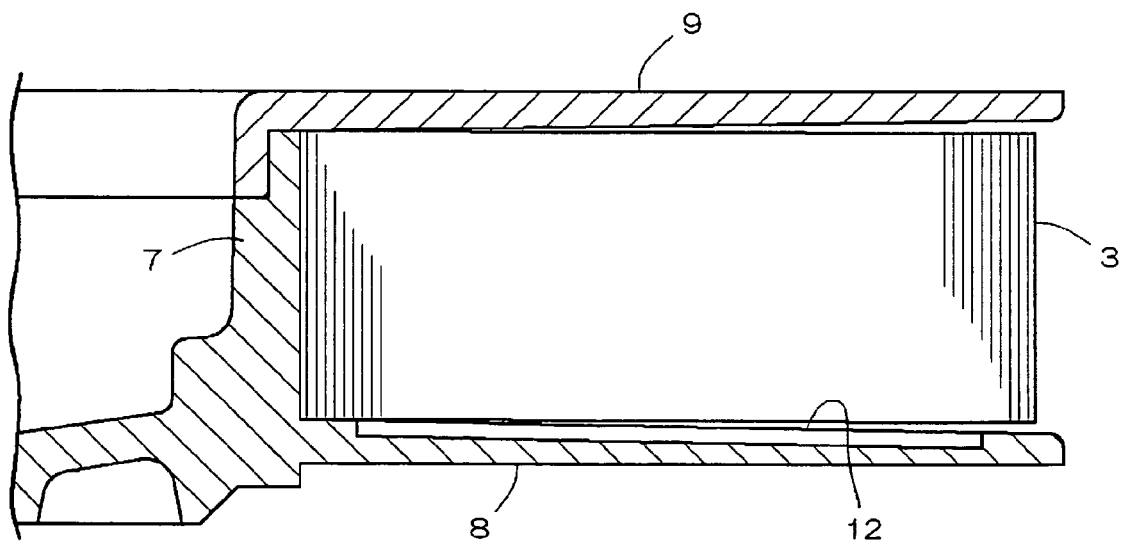
FIG. 7 is a sectional view of a tape reel of a different magnetic tape winding shape.

Although the recess portion for air discharge can be provided from the inner peripheral edge side over to the outer peripheral edge side of the flange, it is preferable to prevent the outermost peripheral edge of the recess portion from reaching the flange outer peripheral edge in consideration of the structure and strength of the flange. In this case, it is preferable to provide an inclined surface of an angle of about 45° at the outer peripheral edge of the recess portion as shown in, for example, FIG. 6 to make a smooth air flow. Although the recess portion is not always required to be separated, the number of the recess portions should preferably be not smaller than three and not greater than sixteen when independent recess portions are provided. The above range is preferable because it becomes difficult to discharge air with well balance when the number of the recess portions is smaller than three, and the balancing effect reaches saturation and much time and labor are necessary for the processing when the number is greater than sixteen.

Figure 5:
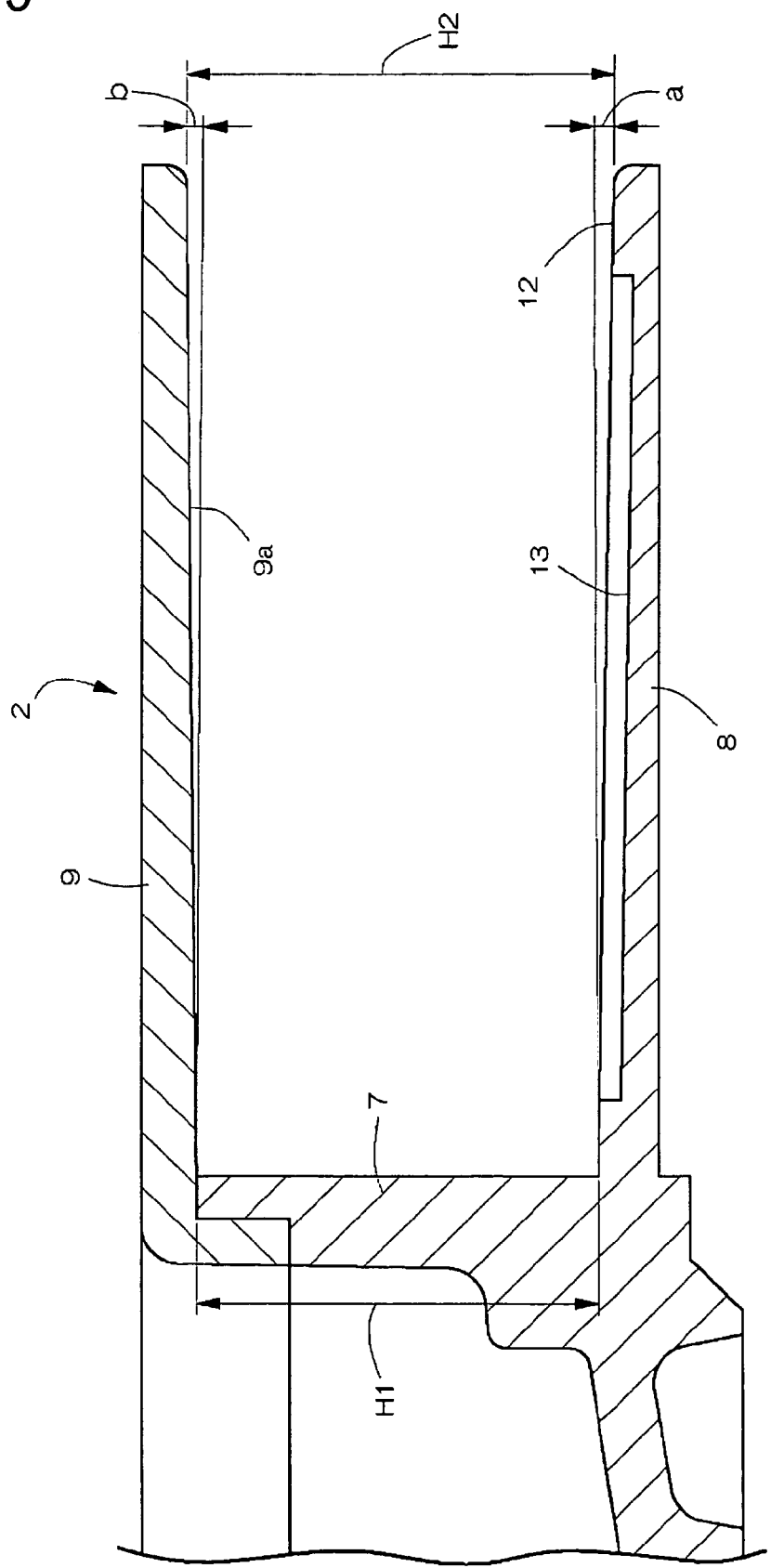
FIG. 5 is a longitudinal sectional front view showing the detail of the flange structure of the tape reel.

In addition to the provision of the recess portion for the reference flange, it is more preferable to form the inner flange surfaces of both the flanges into inclined surfaces so that the spacing between the reference flange and the opposite flange becomes greater on the outer peripheral edge side than on the inner peripheral edge side of the flange as shown in FIG. 5. In forming the inner flange surface into an inclined surface, there are a style such that the flange thickness is gradually reduced from the inner peripheral edge-side toward the outer peripheral edge side of the flange and a style such that the flange is formed entirely inclined with the flange thickness made almost constant in the radial direction. The inclined surface may be formed in either one of the above styles. If the latter style that the thickness of the flange is entirely made approximately constant and the flange itself is formed inclined to the cylindrical hub in the direction in which the spacing between the reference flange and the opposite flange is increased on the outer peripheral edge side than on the inner peripheral edge side of the flange (in the direction in which an angle formed between the upper and lower surfaces of the cylindrical hub and each of the flanges is increased) is adopted, the flange thickness becomes constant, and this is therefore advantageous in terms of flange strength design. Moreover, it is advantageous to adopt the former style that the outer flange surfaces are made roughly parallel to each other and the inner flange surfaces are inclined in order to allow the tape reel to be accommodated in the main body casing of a constant thickness standard and prevent the rotational sway and so on of the tape reel.

The embodiment of the present invention is described in detail below on the basis of the examples. FIG. 1 shows a magnetic tape cartridge of one application example of the present invention. The magnetic tape cartridge includes a rectangular box-shaped main body casing 1, a tape reel 2 accommodated in the casing 1 and a magnetic tape 3 to be wound around the tape reel 2. A tape outlet 4 is opened at the front surface of the main body casing 1. The tape outlet 4 can be closed by a shutter 5 that is slidably urged to close. A pin-shaped tape outlet member 6 can be retained in an upright posture located inside the main body casing 1 near the tape outlet 4, and a leading end of the magnetic tape 3 is fixed to its outer periphery.

Figure 2:
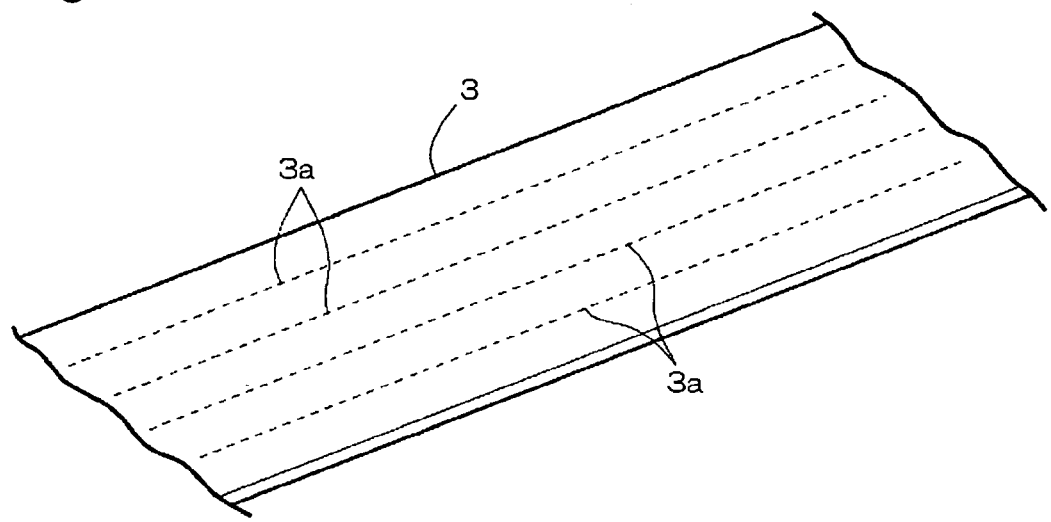
FIG. 2 is a schematic view of servo signals recorded on the magnetic tape.
Figure 3:
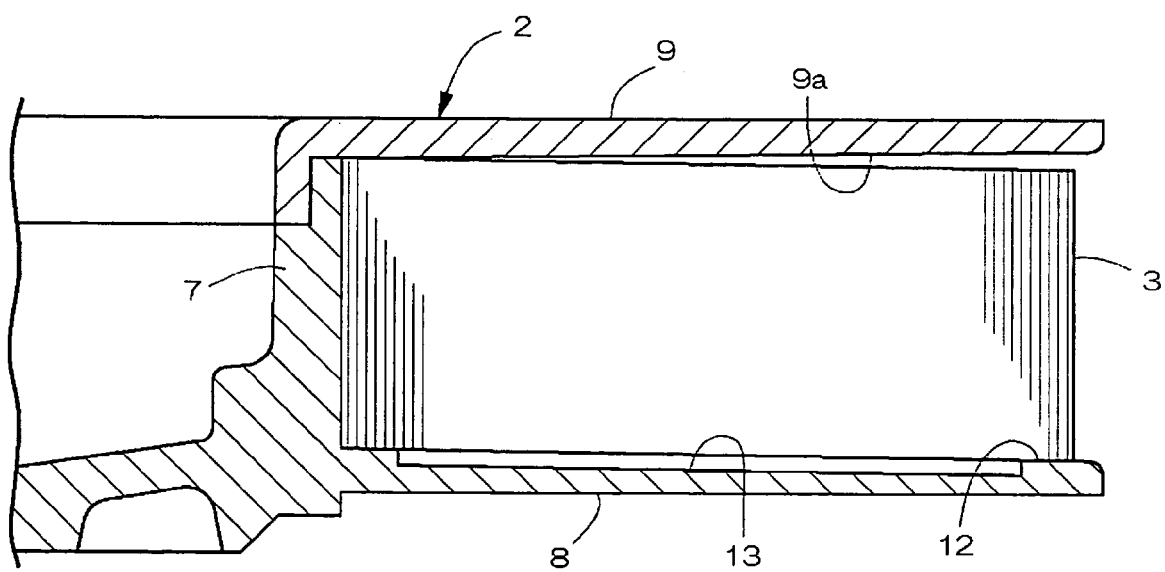
FIG. 3 is a longitudinal sectional front view of a tape reel.
Figure 4:
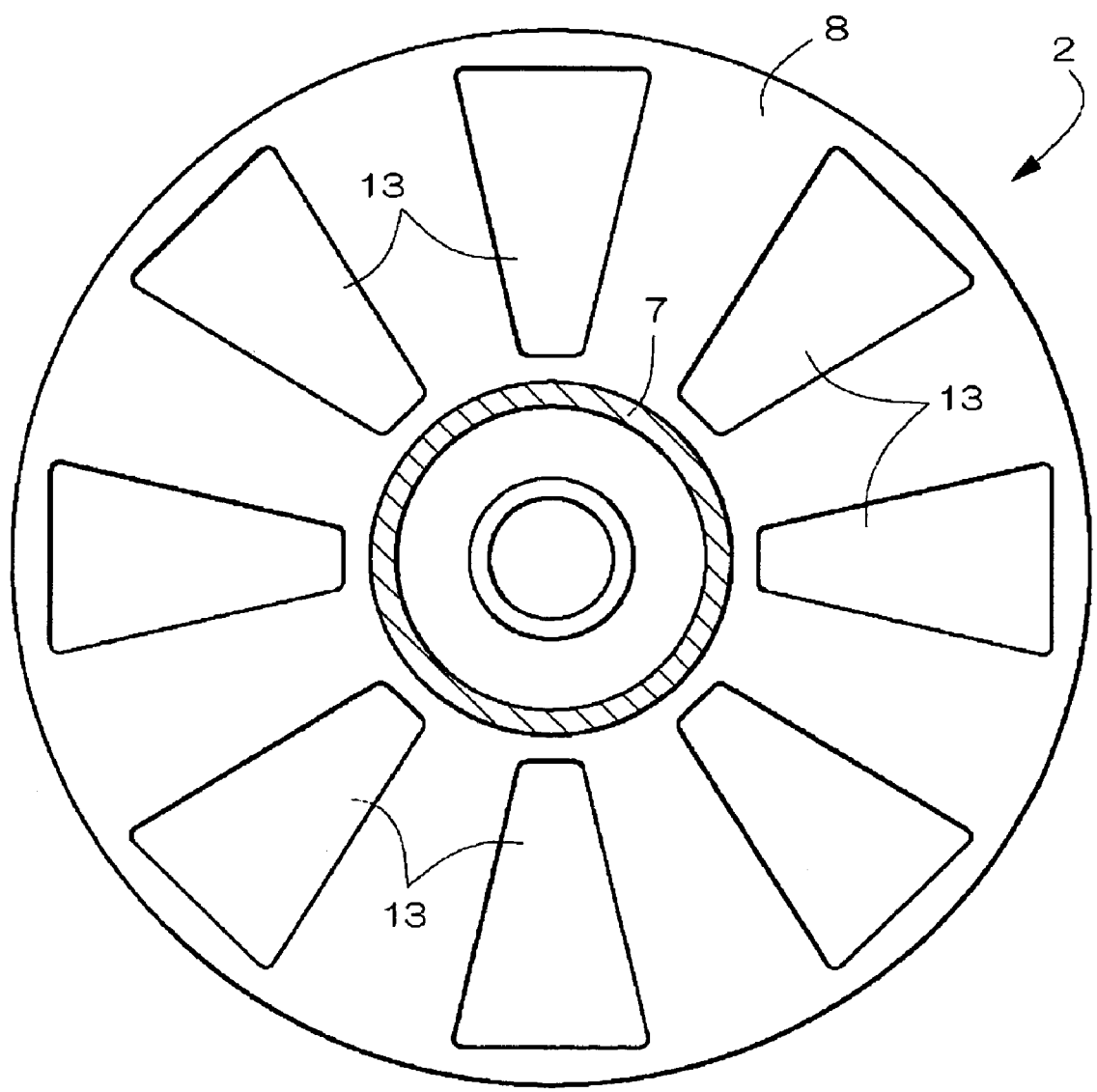
FIG. 4 is a transverse sectional plan view of the tape reel.

In FIG. 2, servo signals 3a are recorded on the magnetic layer of the magnetic tape 3 along the longitudinal direction of the tape during manufacturing, and tracking control of the magnetic head array of the tape drive is executed according to the signals. FIG. 2 is a schematic view for making the principle of the servo tracking system easier to understand, and the arrangement form and the number of the servo signals 3a are different from the actual ones. By opening the shutter 5 and thereafter pulling the tape outlet member 6 out of the main body casing 1, the magnetic tape 3 can be loaded on the tape drive side.

The tape reel 2 has a cylindrical hub 7 opened upward and disk-shaped reel flanges that extend from the upper and lower peripheral ends of the hub 7. In this example, the lower reel flange is served as the reference flange 8 and the upper reel flange is served as the opposite flange 9 out of the upper and lower reel flanges. The tape receiving surface 12 of the reference flange 8 is formed on the inclined surface descending from the flange inner peripheral edge toward the flange outer peripheral edge. Shallow air escape recess portions 13 for discharging air outwardly of the reel are radially formed on the tape receiving surface 12. The air escape recess portions 13 are constituted of trapezoidal recess portions of which the width is gradually narrowed toward the reel center and constructed of eight recess portions formed at regular intervals in the circumferential direction. The peripheral edges of the air escape recess portions 13 are inclined as indicated by the reference numeral 14 in FIG. 6.

The tape reel 2 should preferably be formed of polycarbonate resin that is easy to control the thickness or of glass-fiber-incorporated polycarbonate resin as a material and is allowed to be formed of polystyrene resin, acrylonitrile styrene resin, acrylonitrile butadiene styrene resin or the like as a formation material. For example, it is possible to form the reference flange 8 of glass-fiber-incorporated polycarbonate resin and form the opposite flange 9 of polycarbonate resin.

EXAMPLE 1

In Each of the Examples and Comparative Examples, the "Part(s)" Means Part(s) by Weight (Undercoat Component)
(1)
  Iron oxide powder (mean particle diameter: 0.11×0.02 μm): 68 parts
  Alumina (degree of alphatization: 50%, mean particle diameter: 0.07 μm): 8 parts
  Carbon black (particle diameter: 25 nm): 24 parts
  Stearic acid: 2 parts
  Vinyl chloride copolymer: 8.8 parts (contained $SO_3$ Na radical: $0.7\times10^{-4}$ eq/g)
  Polyester polyurethane resin: 4.4 parts (Tg: 40° C., contained $SO_3$ Na radical: $1\times10^{-4}$ eq/g)
  Cyclohexanone: 25 parts
  Methyl ethyl ketone: 40 parts
  Toluene: 10 parts
(2)
  Stearic acid n-butyl: 1 part
  Cyclohexanone: 70 parts
  Methyl ethyl ketone: 50 parts
  Toluene: 20 parts
(3)
  Polyisocyanate: 1.4 parts
  Cyclohexanone: 10 parts
  Methyl ethyl ketone: 15 parts
  Toluene: 10 parts
(Magnetic Coating Components)
(1) Kneading and Diluting Process
  Ferromagnetic iron based metal powder: 100 parts
  (Co/Fe: 24 at %,
  Y/(Fe+Co): 7.9 at %,
  Al/(Fe+Co): 4.7 wt %
  σs: 120 A·m²/kg (120 emu/g),
  Hc: 175 kA/m (2190 Oe),
  pH: 9.5, mean particle diameter: 60 nm)
  Vinyl chloride-hydroxypropyl acrylate copolymer: 12.3 parts (contained $SO_3$ Na radical: $0.7\times10^{-4}$ eq/g)
  Polyester polyurethane resin: 5.5 parts (contained $SO_3$ Na radical: $1.0\times10^{-4}$ eq/g)
  α-alumina (mean particle diameter: 0.07 μm): 8 parts
  Carbon black: 2.0 parts (mean particle diameter: 75 nm, DBP oil absorption: 72 cc/100 g)
  Methyl acid phosphate: 2 parts
  Palmitic acid amide: 1.5 parts
  Stearic acid n-butyl: 1.0 part
  Tetrahydrofuran: 65 parts
  Methyl ethyl ketone: 245 parts
  Toluene: 85 parts
(2)
  Polyisocyanate: 2.0 parts
  Cyclohexanone: 167 parts The above undercoat components (1) were kneaded by a batch type kneader, and thereafter, the components (2) were added, stirred and thereafter subjected to a dispersion process by a sand mill with a retention time set to 60 minutes. The components (3) were added to this, stirred and filtered, and thereafter a coating for the undercoat layer was made.

Separately from the above, a prescribed amount of the magnetic coating components (1) was preliminarily stirred and mixed at high speed, and the mixed powder was kneaded by a continuous system two-axis kneader and thereafter dispersed with a retention time set to 45 minutes. The magnetic coating components (2) were added to this, stirred and filtered, and thereafter a magnetic coating was made.

The undercoat coating was applied onto a non-magnetic support (base film) made of polyethylene terephthalate (thickness: 6.4 µm, MD=6.1 GPa, MD/TD=0.9, trade name: Lumirror, produced by Toray Industries. Inc.) so that the thickness became 1.1 µm after drying and calendering. The above magnetic coating was further applied by a wet-on-wet technique onto the undercoat layer so that the thickness of the magnetic layer became 0.13 µm after a magnetic field orientation process, drying and a calendering process. After the magnetic field orientation process, the magnetic coating was dried by a drier using far infrared rays, and a magnetic sheet was obtained. The magnetic field orientation process was carried out by arranging N-N opposing magnets (5 kG) in front of the drier and arranging a pair of N-N opposing magnets (5 kG) at an interval of 50 cm located 75 cm apart from the front side of the dry-to-touch position of the coating film inside the drier. The coating speed was set to 100 m/minute.

(Coating components for back coating layer)
Carbon black (mean particle diameter: 25 nm): 80 parts
Carbon black (mean particle diameter: 370 nm): 10 parts
Iron oxide (mean particle diameter: 0.4 µm): 10 parts
Nitrocellulose: 45 parts
Polyurethane resin (containing $SO_3$ Na radical): 30 parts
Cyclohexanone: 260 parts
Methyl ethyl ketone: 525 parts
Toluene: 260 parts The coating components for the back coating layer were dispersed by a sand mill with a retention time set to 45 minutes, and thereafter, the coating for the back coating layer was adjusted by adding 15 parts of polyisocyanate and filtered. Subsequently, the coating for the back coating layer was applied to the opposite surface of the magnetic layer of the magnetic sheet produced as described above and dried so that the thickness became 0.5 µm after drying and a calendering process.

The thus-obtained magnetic sheet was subjected to a mirror surface finishing process on the conditions of a temperature of 100° C. and a linear load of 196 kN/m by a seven-step calender constructed of a metal roll, and the magnetic sheet was subjected to aging at a temperature of 70° C. for 72 hours in a state in which the magnetic sheet is wound around a core. Subsequently, the magnetic sheet was cut into tapes of a width of ½ inches (width of 12.65 mm, which is the standard value of the tape width standard), and the surface of the magnetic layer of the tape was subjected to the postprocessing of wrapping tape grinding, blade grinding and surface wiping while running at a speed of 200 m/min, producing a magnetic tape. In this case, the processing was carried out with a run tension of 30 g by using K10000 for the wrapping tape, a super-hard blade for the blade and Toraysee (trade name) produced by Toray Industries. Inc. for surface wiping.

A servo signal of a minimum wavelength of 5 µm was recorded along the longitudinal direction of the magnetic tape on the magnetic layer of the thus-obtained magnetic tape by means of a servo writer, and a magnetic tape was wound up by a length of about 8000 m per pancake.

The thus-obtained magnetic tape 3 was wound up by a length of about 500 m per reel at high speed (15 m/s) around the tape reel 2 by a winder. The winding tension was set to 30 g at this time. Subsequently, the tape reel 2 were incorporated into the main body casing 1, and a magnetic tape cartridge for computer data was obtained. It is noted that the tape is guided so that the center in the widthwise direction of the magnetic tape 3 is located at the center in the vertical direction at the outer peripheral edges of both the flanges 8 and 9 of the tape reel 2 in the high-speed winder similarly to the magnetic recording and reproducing apparatus.

In the tape reel 2 of FIG. 5, the reference flange 8 and the opposite flange 9 have thicknesses of 1.4 mm and 1.0 mm (uniform in thickness), respectively, and eight air escape recess portions 13 constructed of a sectoral shape of a depth of 0.3 mm are provided for the reference flange 8.

In this case, the thickness dimension values of the flanges are the average values obtained by measuring the flanges 8 and 9 at ten places at regular intervals from the inner peripheral edge to the outer peripheral edge by means of a micrometer of a great depth and a small contact area (digital outside micrometer MDC-25M produced by Mitsutoyo Corporation). The thickness dimension of the reference flange 8 was measured at portions where the air escape recess portions 13 were not provided.

The occupation area of all the air escape recess portions 13 with respect to the total area of the flange surface of the reference flange 8 was set to 60%. The spacing H1 between the reference flange 8 and the opposite flange 9 at the flange inner peripheral edge was set 0.12 mm greater than the standard value (12.65 mm) of the tape width standard of the magnetic tape 3.

The depth dimension value (0.3 mm) of the air escape recess portion 13 is a difference in the vertical thickness dimension between the portion where the air escape recess portion 13 exists and the portion where no air escape recess portion 13 exists on a virtual concentric circle of the reference flange 8. In one air escape recess portion 13, at least three or more places are selected from the inner peripheral edge side to the outer peripheral edge side, and a total of 50 to 100 places are selected for the eight air escape recess portions 13, and the average value measured by the micrometer is adopted.

The occupation area of the air escape recess portions 13 was obtained according to the common procedure. With regard to the inclined portions at the end of the air escape recess portions 13, the portions deeper than 0.05 mm were included in the occupation area.

The tape receiving surface 12 of the reference flange 8 was formed of a descending surface such that a value (dimension "a" of FIG. 5) obtained by subtracting the height dimension of the flange outer peripheral edge from the height dimension of the flange inner peripheral edge became 0.20 mm. The inner flange surface 9a of the opposite flange 9 facing the tape receiving surface 12 was formed of an ascending surface such that a value (dimension "b" of FIG. 5) obtained by subtracting the height dimension of the flange inner peripheral edge from the height dimension of the flange outer peripheral edge became 0.09 mm. The spacing H2 between both the flanges 8 and 9 at the flange outer peripheral edge is 13.06 mm. It is noted that neither recess portion nor groove is formed on the inner flange surface 9a. The reference flange 8 formed integrally with the cylindrical hub 7 was formed of glass-fiber-incorporated polycarbonate resin, and the opposite flange 9 was formed of polycarbonate resin. Moreover, it is noted that the dimensions of the tape reel are the values which are measured in the state of the empty reel (i.e., tape reel without the magnetic tape wound around).

EXAMPLE 2

The magnetic tape cartridge of Example 2 was produced similarly to Example 1 except that the thickness of the reference flange 8 was set to 1.2 mm and the depth of the air escape recess portions 13 provided on the reference flanges 8 was changed to 0.2 mm.

EXAMPLE 3

The magnetic tape cartridge of Example 3 was produced similarly to Example 1 except that the thickness of the reference flange was set to 1.2 mm and the occupation area of the air escape recess portions 13 provided on the reference flanges 8 was changed to 80%.

EXAMPLE 4

The magnetic tape cartridge of Example 4 was produced similarly to Example 1 except that the thickness of the reference flange 8 was set to 1.2 mm and the spacing H1 between both the flanges 8 and 9 at the flange inner peripheral edges was set 0.06 mm greater than the standard value (12.65 mm) of the tape width standard of the magnetic tape 3.

EXAMPLE 5

The magnetic tape cartridge of Example 5 was produced similarly to Example 1 except that thickness of the reference flange 8 was set to 1.2 mm and the dimension "b" of the opposite flange 9 was set to 0.15 mm.

EXAMPLE 6

The magnetic tape cartridge of Example 6 was produced similarly to Example 5 except that the dimension "b" of the opposite flange 9 was set to zero and the inner flange surface 9a was formed parallel to the outer flange surface.

EXAMPLE 7

With regard to the reference flange 8, the thickness of the flange inner peripheral edge was set to 1.65 mm, the thickness of the outer peripheral edge was set to 1.55 mm, the dimension "a" of the tape receiving surface 12 was set to 0.10 mm (the outer flange surface was horizontal), and twelve air escape recess portions 13 of a recess depth of 0.20 mm were formed on the reference flange 8. The air escape recess portions 13 were formed at regular intervals so that the occupation area thereof became 50% of the total area of the flange surface of the reference flange 8. With regard to the opposite flange 9, the thickness of the flange inner peripheral edge was set to 1.60 mm, the thickness of the outer peripheral edge was set to 1.50 mm, and the dimension "b" of the inner flange surface 9a was set to 0.10 mm. The outer flange surfaces of the reference flange 8 and the opposite flange 9 were each made horizontal and parallel to each other. The magnetic tape cartridge of Example 7 was produced similarly to Example 1 except that the winding speed of the magnetic tape 3 with respect to the tape reel 2 was changed to 20 m/sec.

EXAMPLE 8-EXAMPLE 11

The magnetic tape cartridge of Example 8 through Example 11 were produced similarly to Example 7 except that the winding speed with respect to the tape reel 2 of the magnetic tape 3 was changed as shown in Table 2-1.

EXAMPLE 12

With regard to the reference flange 8, the thickness of the flange inner peripheral edge was set to 1.75 mm, the thickness of the outer peripheral edge was set to 1.55 mm, and the dimension "a" of the tape receiving surface 12 was set to 0.20 mm. Twelve sectoral air escape recess portions 13 of a uniform recess depth of 0.10 mm were formed at regular intervals on the reference flange 8 so that the occupation area of all the air escape recess portions 13 became 50%. With regard to the opposite flange 9, the thickness of the flange inner peripheral edge was set to 1.60 mm, the thickness of the outer peripheral edge was set to 1.40 mm, and the dimension "b" of the inner flange surface 9a was set to 0.20 mm. The outer flange surfaces were made horizontal. No recess portion is formed on the inner flange surface 9a. Moreover, The spacing H1 between both the flanges 8 and 9 at the flange inner peripheral edge was set to a greater value by 0.02 mm than a standard value (12.65 mm) of the tape width gauge of the magnetic tape 3. The magnetic tape cartridge of Example 12 was produced similarly to Example 7 except for the above arrangement.

EXAMPLE 13

Rectangular recess portions of a recess depth of 0.2 mm were formed on the inner flange surface 9a of the opposite flange 9. Four recess portions were formed at regular intervals so that the occupation area of all the recess portions became 9% with respect to the total area of the flange surface. The magnetic tape cartridge of Example 13 was produced similarly to Example 7 except for the above arrangement.

EXAMPLE 14

The magnetic tape cartridge of Example 14 was produced similarly to Example 1 except that the thickness of the reference flange 8 was set to 1.6 mm, the recess depth of the air escape recess portions 13 provided on the reference flange 8 was changed to 0.30 mm, and the thickness of the opposite flange 9 was changed to 1.4 mm.

COMPARATIVE EXAMPLE 1

The magnetic tape cartridge of Comparative Example 1 was produced similarly to Example 1 except that the thickness of the reference flange 8 was set to 0.8 mm, which is smaller than the thickness of the opposite flange 9.

COMPARATIVE EXAMPLE 2

The magnetic tape cartridge of Comparative Example 2 was produced similarly to Example 1 except that no recess portion 13 was provided on the tape receiving surface 12 of the reference flange 8.

COMPARATIVE EXAMPLE 3

The magnetic tape cartridge of Comparative Example 3 was produced similarly to Example 1 except that the thickness of the reference flange 8 was set to 1.0 mm equal to that of the opposite flange 9.

COMPARATIVE EXAMPLE 4

The magnetic tape cartridge of Comparative Example 4 was produced similarly to Example 7 except that the thickness of the reference flange 8 was set to a uniform thickness of 1.65 mm and the tape receiving surface 12 of the reference flange 8 was made without an inclination.

COMPARATIVE EXAMPLE 5

The magnetic tape cartridge of Comparative Example 5 was produced similarly to Example 7 except that the thickness of the reference flange 8 was changed so that the thickness became equal to that of the opposite flange 9.

COMPARATIVE EXAMPLE 6

The magnetic tape cartridge of Comparative Example 6 was produced similarly to Example 12 except that the thickness of the reference flange 8 was set to a uniform thickness of 1.75 mm, the tape receiving surface 12 of the reference flange 8 was made without an inclination, the thickness of the opposite flange 9 was set to a uniform thickness of 1.60 mm, and the inner flange surface 9a of the opposite flange 9 was made without an inclination.

COMPARATIVE EXAMPLE 7

The magnetic tape cartridge of Comparative Example 7 was produced similarly to Example 7 except that the air escape recess portions were not provided for the reference flange 8.

COMPARATIVE EXAMPLE 8

The magnetic tape cartridge of Comparative Example 8 was produced similarly to Example 7 except that the recess depth of the air escape recess portions 13 of the reference flange 8 was changed to 0.04 mm.

COMPARATIVE EXAMPLE 9

The same air escape recess portions 13 as those of the reference flange 8 were formed on the opposite flange 9. The magnetic tape cartridge of Comparative Example 9 was produced similarly to Example 7 except that the upper and lower air escape recess portions 13 had their recess portions mutually shifted.

REFERENTIAL EXAMPLE 1

The magnetic tape cartridge of Referential Example 1 was produced similarly to Example 1 except that the thickness of the reference flange 8 was set to 2.2 mm.

EVALUATION OF EXAMPLES

Reference flange strength, winding shape, amount of edge projection, output fluctuation and so on were evaluated with regard to Examples. The evaluation results are shown in Table 1, Tables 2-1, 2-2 and FIGS. 8 through 14.

(Reference Flange Strength)

Given that a displacement and a stress when the reference flange was bent by 0.2 mm in the thickness direction in a reel around which no magnetic tape is wound were D1 and F1, respectively, and given that a displacement and a stress when the reference flange was similarly bent by 0.4 mm were D2 and F2, respectively, a stress necessary for bending the reference flange by 0.1 mm expressed by (F2-F1)(D2-D1)/10 was evaluated as a flange strength. The stress was read by a force gauge.

(Winding Shape 1)

The opposite flange was removed immediately after the magnetic tape was wound around the tape reel by a high-speed winder, and the winding shape surface (i.e., tape edge surface) of the tape wound around the reel was observed. A case where the edge surface was flat was evaluated as a mark "o", a case where the edge surface was slightly disordered was evaluated as a mark "Δ", and a case where the edge surface was largely disordered was evaluated as a mark "x".

(Winding Shape 2)

The opposite flange was removed after one reciprocative continuous run by the DLT4000 drive, and the winding shape surface (i.e., tape edge surface) of the tape wound around the reel was observed. A case where the edge surface was flat was evaluated as a mark "o", a case where the edge surface was slightly disordered was evaluated as a mark "Δ", and a case where the edge surface was largely disordered was evaluated as a mark "x".

(Edge Projection Amount 1)

The opposite flange was removed immediately after the magnetic tape was wound up by the high-speed winder, and the amount of edge projection was measured by a measuring microscope capable of measuring the amount in a Z-axis direction. The maximum value was evaluated as the edge projection amount 1.

(Edge Projection Amount 2)

The opposite flange was removed after one reciprocative continuous run by the DLT4000 drive, and the amount of edge projection was measured by the measuring microscope capable of measuring the amount in the Z-axis direction. The maximum value was evaluated as the edge projection amount 2.

(Winding Shape and Edge Projection Amount)

Figure 15A:
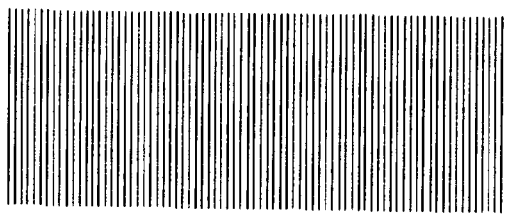
FIGS. 15A-15H are sectional schematic views of edge surfaces, showing the magnetic tape winding shape.
Figure 15E:
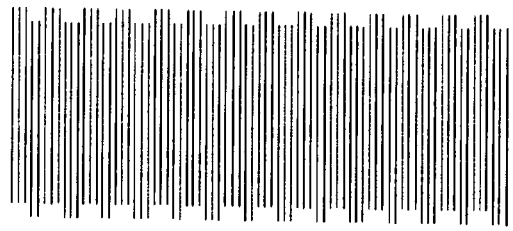
Figure 15B:
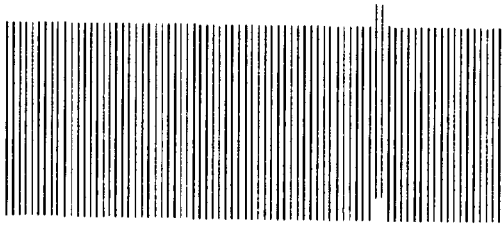
Figure 15F:
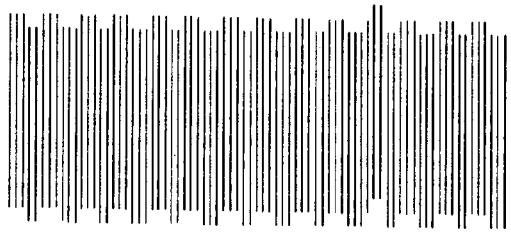
Figure 15C:
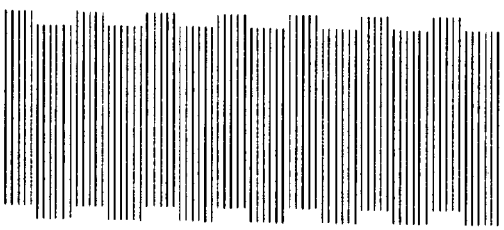
Figure 15G:
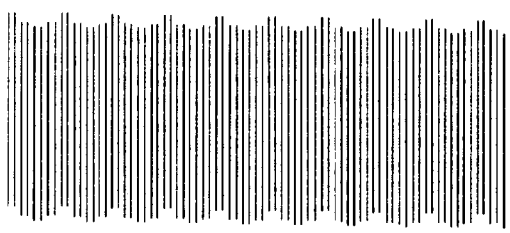
Figure 15D:
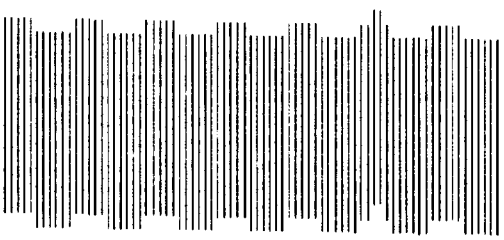
Figure 15H:
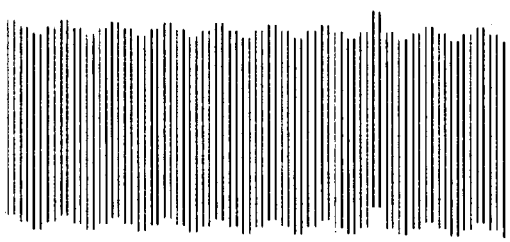

FIGS. 15A-15H are sectional schematic views of edge surfaces. FIGS. 15A and 15B show examples evaluated as the mark "o", and FIGS. 15C-15H show example evaluated as the mark "x". Although there is not shown a example evaluated as the mark "Δ", such example intermediates between the mark "o" and the mark "x". FIGS. 15B, 15D, 15F and 15H show the cases where the edge projection occurred, respectively.

(Output Fluctuation)

After a 2T signal was recorded throughout the length by the DLT4000 drive, and given that the maximum output was $V_{max}$, the minimum output was $V_{min}$ and the average output was $V_{ave}$ during reproduction throughout the total length, the output fluctuation was expressed as $20 \log_{10}((V_{max}-V_{min})+V_{ave})/V_{ave})$ in dB units.

TABLE 1

|  | Examples | | | | | | | Comparative Examples | | | Ref. Ex. |
|---|---|---|---|---|---|---|---|---|---|---|---|
|  | Ex. 1 | Ex. 2 | Ex. 3 | Ex. 4 | Ex. 5 | Ex. 6 | Ex. 14 | Comp. Ex. 1 | Comp. Ex. 2 | Comp. Ex. 3 | 1 |
| Reference flange | With recess | With recess | With recess | With recess | With recess | With recess | With recess | With recess | No recess | With recess | With recess |
| Innermost peripheral flange thickness (mm) | 1.40 | 1.20 | 1.20 | 1.20 | 1.20 | 1.20 | 1.60 | 0.80 | 1.20 | 1.00 | 2.20 |
| Outermost peripheral flange thickness (mm) | 1.40 | 1.20 | 1.20 | 1.20 | 1.20 | 1.20 | 1.60 | 0.80 | 1.20 | 1.00 | 2.20 |

TABLE 1-continued

|  | Examples |  |  |  |  |  |  | Comparative Examples |  |  |  |
|---|---|---|---|---|---|---|---|---|---|---|---|
|  | | | | | | | | Comp. Ex. 1 | Comp. Ex. 2 | Comp. Ex. 3 | Ref. Ex. 1 |
|  | Ex. 1 | Ex. 2 | Ex. 3 | Ex. 4 | Ex. 5 | Ex. 6 | Ex. 14 | | | | |
| Average flange thickness (mm) | 1.40 | 1.20 | 1.20 | 1.20 | 1.20 | 1.20 | 1.60 | 0.80 | 1.20 | 1.00 | 2.20 |
| Degree of inclination (dimension "a") (mm) | 0.20 | 0.20 | 0.20 | 0.20 | 0.20 | 0.20 | 0.20 | 0.20 | 0.20 | 0.20 | 0.20 |
| Average recess depth (mm) | 0.30 | 0.20 | 0.30 | 0.30 | 0.30 | 0.30 | 0.30 | 0.30 | — | 0.30 | 0.30 |
| Recess occupation area (%) | 60 | 60 | 80 | 60 | 60 | 60 | 60 | 60 | — | 60 | 60 |
| Recess count | 8 | 8 | 8 | 8 | 8 | 8 | 8 | 8 | — | 8 | 8 |
| Recess shape | Sectoral | Sectoral | Sectoral | Sectoral | Sectoral | Sectoral | Sectoral | Sectoral | — | Sectoral | Sectoral |
| Opposite flange | No recess | No recess | No recess | No recess | No recess | No recess | No recess | No recess | No recess | No recess | No recess |
| Innermost peripheral flange thickness (mm) | 1.00 | 1.00 | 1.00 | 1.00 | 1.00 | 1.00 | 1.40 | 1.00 | 1.00 | 1.00 | 1.00 |
| Outermost peripheral flange thickness (mm) | 1.00 | 1.00 | 1.00 | 1.00 | 1.00 | 1.00 | 1.40 | 1.00 | 1.00 | 1.00 | 1.00 |
| Average flange thickness (mm) | 1.00 | 1.00 | 1.00 | 1.00 | 1.00 | 1.00 | 1.40 | 1.00 | 1.00 | 1.00 | 1.00 |
| Degree of inclination (dimension "b") (mm) | 0.09 | 0.09 | 0.09 | 0.09 | 0.15 | 0.00 | 0.09 | 0.09 | 0.09 | 0.09 | 0.09 |
| Average recess depth (mm) | — | — | — | — | — | — | — | — | — | — | — |
| Recess occupation area (%) | — | — | — | — | — | — | — | — | — | — | — |
| Recess count | — | — | — | — | — | — | — | — | — | — | — |
| Recess shape | — | — | — | — | — | — | — | — | — | — | — |
| Difference in average flange thickness between both flanges (mm) | 0.40 | 0.20 | 0.20 | 0.20 | 0.20 | 0.20 | 0.2 | −0.20 | 0.20 | 0.00 | 1.20 |
| Reference flange strength (N) | 1.40 | 1.25 | 1.20 | 1.20 | 1.20 | 1.20 | 1.65 | 0.75 | 1.30 | 1.00 | 2.20 |
| Spacing between flange inner peripheral edges | +0.12 | +0.12 | +0.12 | +0.06 | +0.12 | +0.12 | +0.12 | +0.12 | +0.12 | +0.12 | +0.12 |
| Winding speed (m/sec) | 15 | 15 | 15 | 15 | 15 | 15 | 15 | 15 | 15 | 15 | 15 |
| Winding shape during winding: Winding shape 1 | ○ | ○ | Δ | ○ | ○ | ○ | ○ | x | x | x | ○ |
| Winding shape after recording and reproduction: Winding shape 2 | ○ | ○ | Δ | ○ | ○ | ○ | ○ | x | x | Δ | Note 1 |
| Amount of edge projection during winding (mm): Edge projection amount 1 | 0.07 | 0.07 | 0.13 | 0.08 | 0.08 | 0.05 | 0.07 | 0.32 | 0.26 | 0.28 | 0.06 |
| Amount of edge projection after recording and reproduction (mm): Edge projection amount 2 | 0.05 | 0.05 | 0.12 | 0.07 | 0.05 | 0.02 | 0.05 | 0.25 | 0.20 | 0.21 | Note 1 |
| Output fluctuation (dB) | 0.9 | 0.7 | 1.3 | 1.0 | 0.9 | 1.1 | 1.0 | 2.3 | 2.0 | 2.2 | Note 1 |

Note 1: Not measured because it could not be accommodated in cartridge.

Table 1 shows the evaluation results and the flange conditions of Examples 1 through 6, Example 14, Comparative Examples 1 through 3 and Referential Example 1. Table 1 shows the results in the case where the reference flange 8 and the opposite flange 9 having equal thickness in the radial direction are provided in inclined postures with respect to the cylindrical hub 7. The degree of inclination of the reference flange corresponds to the dimension "a" of FIG. 5, and the degree of inclination of the opposite flange corresponds to the dimension "b" of FIG. 5.

As is apparent from Table 1, in Comparative Example 1, the edge projection is observed both immediately after winding and immediately after recording and reproduction, and the output fluctuation is also large. This is because a force for winding the magnetic tape along the reference flange is not effective since the thickness of the reference flange is smaller than that of the opposite flange, and the effect of the grooves of the reference flange is not produced since the magnetic tape is wound almost along the opposite flange immediately after winding and during recording and reproduction. Moreover, the flange strength is also small in Comparative Example 1. In Comparative Example 2, the edge projection is observed immediately after winding and during recording and reproduction, and the output fluctuation is also large. This is because the edge projection occurs since the reference flange has no recess portion. Moreover, in Comparative Example 3, the edge projection is observed immediately after winding and during recording and reproduction, and the output fluctuation is also large. The reason for the above is similar to the case of Comparative Example 1. In Referential Example 1, the edge projection is not observed immediately after winding, and the flange strength is also increased. However, since the thickness of the reference flange was excessively great, the tape reel could not be assembled into the main body casing. Therefore, the evaluation of the characteristics of the output fluctuation and so on was not executed for the Referential Example 1.

On the other hand, it can be understood that the magnetic tapes wound around the tape reels of Examples 1 through 6 and Example 14 are superior in characteristics to the magnetic tapes wound around the tape reels of Comparative Example 1 through Comparative Example 3. This is because the tape reels of Examples 1 through 6 and Example 14 have the features: (1) the average value of the thickness of the reference flange is greater than the average value of the thickness of the opposite flange, (2) the reference flange has on the inside thereof the inclined surface such that the spacing between both the flanges is greater at the flange outer peripheral edge than at the flange inner peripheral edge, (3) the air escape recess portions are provided on the inner surface side of the reference flange and the depth thereof is not smaller than 0.05 mm and not greater than 0.40 mm and the occupation area thereof is not smaller than 30% and not greater than 80% of the total area of the flange surface, and (4) no groove exists on the inner surface side of the opposite flange on the stable winding side.

TABLE 2-1

|  | Examples | | | | | | |
| --- | --- | --- | --- | --- | --- | --- | --- |
|  | Ex. 7 | Ex. 8 | Ex. 9 | Ex. 10 | Ex. 11 | Ex. 12 | Ex. 13 |
| Reference flange | With Recess | With Recess | With Recess | With Recess | With Recess | With Recess | With Recess |
| Innermost peripheral flange thickness (mm) | 1.65 | 1.65 | 1.65 | 1.65 | 1.65 | 1.75 | 1.65 |
| Outermost peripheral flange thickness (mm) | 1.55 | 1.55 | 1.55 | 1.55 | 1.55 | 1.55 | 1.55 |
| Average flange thickness (mm) | 1.60 | 1.60 | 1.60 | 1.60 | 1.60 | 1.65 | 1.60 |
| Degree of inclination (dimension "a") (mm) | 0.10 | 0.10 | 0.10 | 0.10 | 0.10 | 0.20 | 0.10 |
| Average recess depth (mm) | 0.20 | 0.20 | 0.20 | 0.20 | 0.20 | 0.10 | 0.20 |
| Recess occupation Area (%) | 50 | 50 | 50 | 50 | 50 | 50 | 50 |
| Recess count | 12 | 12 | 12 | 12 | 12 | 12 | 12 |
| Recess shape | Sectoral | Sectoral | Sectoral | Sectoral | Sectoral | Sectoral | Sectoral |
| Opposite flange | No Recess | No Recess | No Recess | No Recess | No Recess | No Recess | No Recess |
| Innermost peripheral flange thickness (mm) | 1.60 | 1.60 | 1.60 | 1.60 | 1.60 | 1.60 | 1.60 |
| Outermost peripheral flange Thickness (mm) | 1.50 | 1.50 | 1.50 | 1.50 | 1.50 | 1.40 | 1.50 |
| Average flange thickness (mm) | 1.55 | 1.55 | 1.55 | 1.55 | 1.55 | 1.50 | 1.55 |
| Degree of inclination (dimension "b") (mm) | 0.10 | 0.10 | 0.10 | 0.10 | 0.10 | 0.20 | 0.10 |
| Average recess depth (mm) | — | — | — | — | — | — | 0.20 |
| Recess occupation area (%) | — | — | — | — | — | — | 9 |
| Recess count | — | — | — | — | — | — | 4 |
| Recess shape | — | — | — | — | — | — | Rectangular |
| Difference in average flange thickness between both flanges (mm) | 0.05 | 0.05 | 0.05 | 0.05 | 0.05 | 0.15 | 0.05 |
| Spacing between flange inner peripheral edges | +0.12 | +0.12 | +0.12 | +0.12 | +0.12 | +0.20 | +0.12 |
| Winding speed (m/sec) | 20 | 25 | 10 | 15 | 18 | 20 | 20 |
| Winding shape during winding: Winding shape 1 | Δ | x | ○ | Δ | Δ | Δ | Δ |
| Winding shape after recording and reproduction: Winding shape 2 | ○ | ○ | ○ | ○ | ○ | ○ | ○ |
| Amount of edge projection after winding (mm): Edge projection amount 1 | 0.05 | 0.08 | 0.04 | 0.04 | 0.06 | 0.06 | 0.07 |
| Amount of edge projection after recording and reproduction (mm): Edge projection amount 2 | 0.03 | 0.05 | 0.02 | 0.03 | 0.05 | 0.04 | 0.03 |
| Output fluctuation (dB) | 0.5 | 0.9 | 0.4 | 0.5 | 0.9 | 0.8 | 0.6 |

TABLE 2-2

|  | Comparative Examples | | | | | |
| --- | --- | --- | --- | --- | --- | --- |
|  | Comp. Ex. 4 | Comp. Ex. 5 | Comp. Ex. 6 | Comp. Ex. 7 | Comp. Ex. 8 | Comp. Ex. 9 |
| Reference flange | With Recess | With Recess | With Recess | No Recess | With Recess | With Recess |
| Innermost peripheral flange thickness (mm) | 1.65 | 1.60 | 1.75 | 1.65 | 1.65 | 1.65 |
| Outermost peripheral flange thickness (mm) | 1.65 | 1.50 | 1.75 | 1.55 | 1.55 | 1.55 |
| Average flange thickness (mm) | 1.65 | 1.55 | 1.75 | 1.60 | 1.60 | 1.60 |
| Degree of inclination (dimension "a") (mm) | 0.00 | 0.10 | 0.00 | 0.10 | 0.10 | 0.10 |
| Average groove depth (mm) | 0.20 | 0.20 | 0.10 | — | 0.04 | 0.20 |
| Groove occupation Area (%) | 50 | 50 | 50 | — | 50 | 50 |
| Groove count | 12 | 12 | 12 | — | 12 | 12 |
| Groove shape | Sectoral | Sectoral | Sectoral | — | Sectoral | Sectoral |
| Opposite flange | No Recess | No Recess | No Recess | No Recess | No Recess | With Recess |

TABLE 2-2-continued

|  | Comparative Examples | | | | | |
| --- | --- | --- | --- | --- | --- | --- |
|  | Comp. Ex. 4 | Comp. Ex. 5 | Comp. Ex. 6 | Comp. Ex. 7 | Comp. Ex. 8 | Comp. Ex. 9 |
| Innermost peripheral flange thickness (mm) | 1.60 | 1.60 | 1.60 | 1.60 | 1.60 | 1.60 |
| Outermost peripheral flange Thickness (mm) | 1.50 | 1.50 | 1.60 | 1.60 | 1.50 | 1.50 |
| Average flange thickness (mm) | 1.55 | 1.55 | 1.60 | 1.60 | 1.55 | 1.55 |
| Degree of inclination (dimension "b") (mm) | 0.10 | 0.10 | 0.00 | 0.00 | 0.10 | 0.10 |
| Average groove depth (mm) | — | — | — | — | — | 0.20 |
| Groove occupation area (%) | — | — | — | — | — | 50 |
| Groove count | — | — | — | — | — | 12 |
| Groove shape | — | — | — | — | — | Sectoral |
| Difference in average flange thickness between both flanges (mm) | 0.10 | 0.00 | 0.15 | 0.00 | 0.05 | 0.05 |
| Spacing between flange inner peripheral edges | +0.12 | +0.12 | +0.20 | +0.12 | +0.12 | +0.12 |
| Winding speed (m/sec) | 20 | 20 | 20 | 10 | 20 | 20 |
| Winding shape during winding: Winding shape 1 | Δ | Δ | Δ | ○ | Δ | Δ |
| Winding shape after recording and reproduction: Winding shape 2 | Δ | Δ | Δ | ○ | ○ | Δ |
| Amount of edge projection after winding (mm): Edge projection amount 1 | 0.20 | 0.16 | 0.20 | 0.21 | 0.21 | 0.24 |
| Amount of edge projection after recording and reproduction (mm): Edge projection amount 2 | 0.15 | 0.14 | 0.13 | 0.19 | 0.09 | 0.10 |
| Output fluctuation (dB) | 1.8 | 1.8 | 1.7 | 2.1 | 1.8 | 1.9 |

Tables 2-1 and 2-2 show the evaluation results and flange conditions of Examples 7 through 13 and Comparative Examples 4 through 9. Tables 2-1 and 2-2 show the results in the case where the inclined surface is provided on the inside of the upper and lower flanges so that the flange inner peripheral edge portion has a thickness greater than that of the outer peripheral edge portion. It is noted that the upper and lower outer flange surfaces are almost parallel to each other.

As is apparent from Table 2-2, in Comparative Example 4 and Comparative Example 6, the edge projection is observed immediately after winding and after recording and reproduction and the output fluctuation is also large although the winding shape is not bad. This is because a force for guiding the magnetic tape toward the reference flange is not effective since the tape receiving surface of the reference flange is not inclined, and the intruding air discharge effect is not produced by the air escape recess portions of the reference flange. Also, in Comparative Example 5, the edge projection is observed immediately after winding and after recording and reproduction and the output fluctuation is also large although the winding shape is not bad. This is because a force for urging the magnetic tape toward the reference flange side is not effective since the thickness of the reference flange is equal to that of the opposite flange, and the air discharge effect is not produced by the air escape recess portions of the reference flange. In Comparative Example 7, the edge projection is observed immediately after winding and after recording and reproduction and the output fluctuation is also large although the winding shape is good. This is because the reference flange has no air escape recess portion. In Comparative Example 8, the edge projection is observed immediately after winding and after recording and reproduction and the output fluctuation is also large although the winding shape is not bad. This is because the air escape recess portions of the reference flange are extremely shallow. In Comparative Example 9, the edge projection is observed immediately after winding and after recording and reproduction and the output fluctuation is also large although the winding shape is not bad. This is because the opposite flange has a recess portion of an occupation area of not lower than 10%.

In contrast to this, as is apparent from Table 2-1, it can be understood that the magnetic tapes wound around the tape reels of Examples 7 through 12 of the present invention are superior in characteristics to the magnetic tapes wound around the tape reels of Comparative Example 4 through Comparative Example 9. This is because the tape reels of Examples 7 through 12 have the features: (a) the upper and lower flange outer surfaces are almost parallel to each other, (b) the flange spacing at the flange inner peripheral edge is not smaller than 0.06 mm and not greater than 0.30 mm above the central value of the tape width standard, (c) the inner flange surfaces are formed into inclined surfaces, (d) the spacing between both the flanges is greater in the flange outer peripheral edge portion than in the flange inner peripheral edge portion within the range of not smaller than 0.10 mm and not greater than 0.45 mm, (e) the tape receiving surface of the reference flange has a plurality of air escape recess portions, of which the depth is not smaller than 0.05 mm and not greater than 0.40 mm and the occupation area is not lower than 30% and not higher than 80% of the total area of the flange surface, (f) no groove exists on the inner flange surface of the opposite flange, and (g) the average value of the thickness of the reference flange is not smaller than 0.02 mm and not greater than 0.25 mm above the average value of the thickness of the opposite flange. Moreover, as is apparent from Example 13, no edge projection occurs and the output deterioration is a little even when a groove of less than 10% exists on the opposite flange.

It is noted that the tape reels of Examples 7, 8, 12 and 13 exhibit no edge projection and a little output fluctuation even when wound at a winding speed of not lower than 20 m/sec.

Next, the critical meaning of various numerical values of the present invention is clarified referring to FIGS. 8 through 12.

Figure 8:
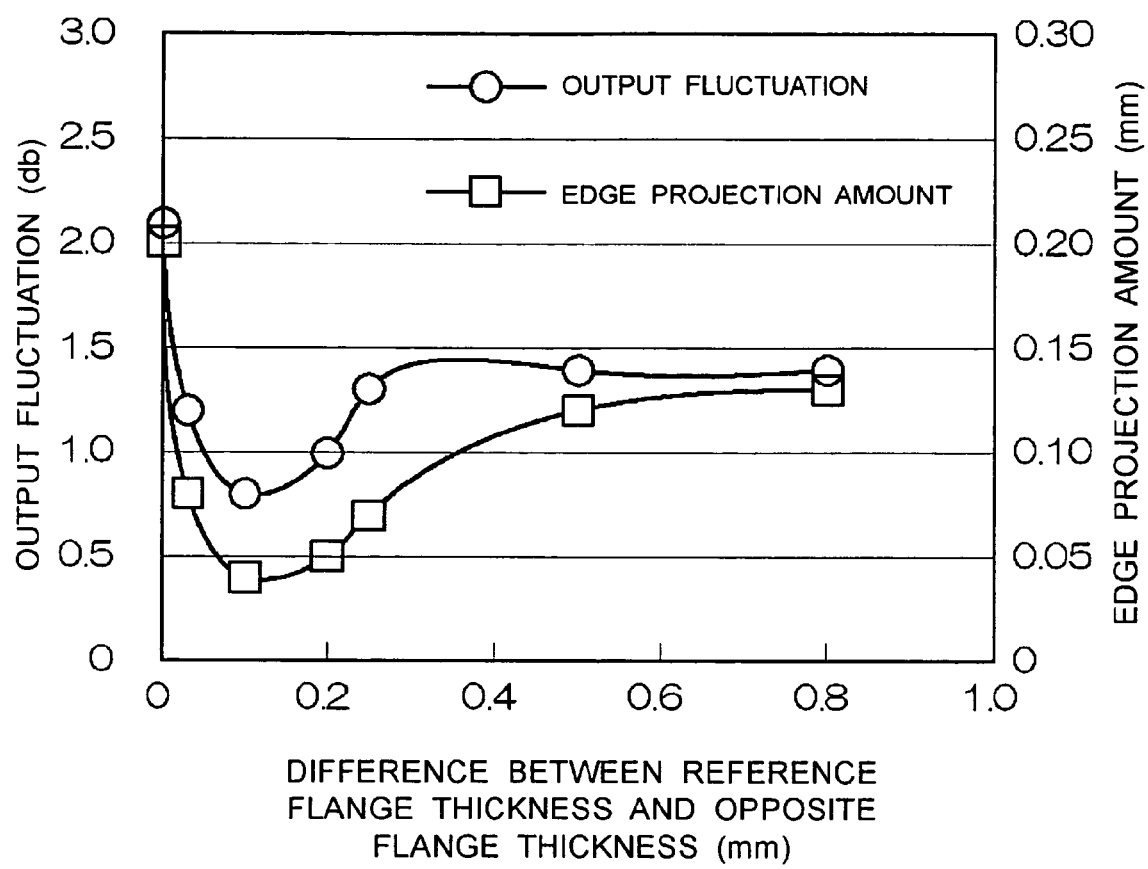
FIG. 8 is a graph showing the correlation between a flange thickness and output fluctuation and so on of the magnetic tape.

FIG. 8 shows the relation of a difference in the thickness between the reference flange and the opposite flange to the amount of edge projection and output fluctuation. There was changed the thickness of the opposite flange of the reference flange using the tape reel of Example 14 as a basic form.

As is apparent from FIG. 8, the edge projection is reduced and the output fluctuation is reduced when the thickness of the reference flange is made greater than the thickness of the other one. In particular, the effect becomes remarkable when the flange thickness of the reference flange is set to 0.02 mm or more. When the difference between the thickness of the reference flange and the thickness of the opposite flange is within a range of 0.02 mm through 0.1 mm, the edge projection amount and the output fluctuation become reduced as enlarging the difference. When the difference is not smaller than 0.1, the edge projection amount and the output fluctuation are slightly increased, and when the difference is not smaller than 0.5, the edge projection amount and the output fluctuation become almost constant values. When the difference is not smaller than 0.02 mm and not greater than 0.25 mm, the effect of reducing the edge projection amount and the output fluctuation is most significant. Therefore, the difference between the thickness of the reference flange and the thickness of the opposite flange should preferably be not smaller than 0.02 mm and not greater than 0.25 mm.

Figure 9:
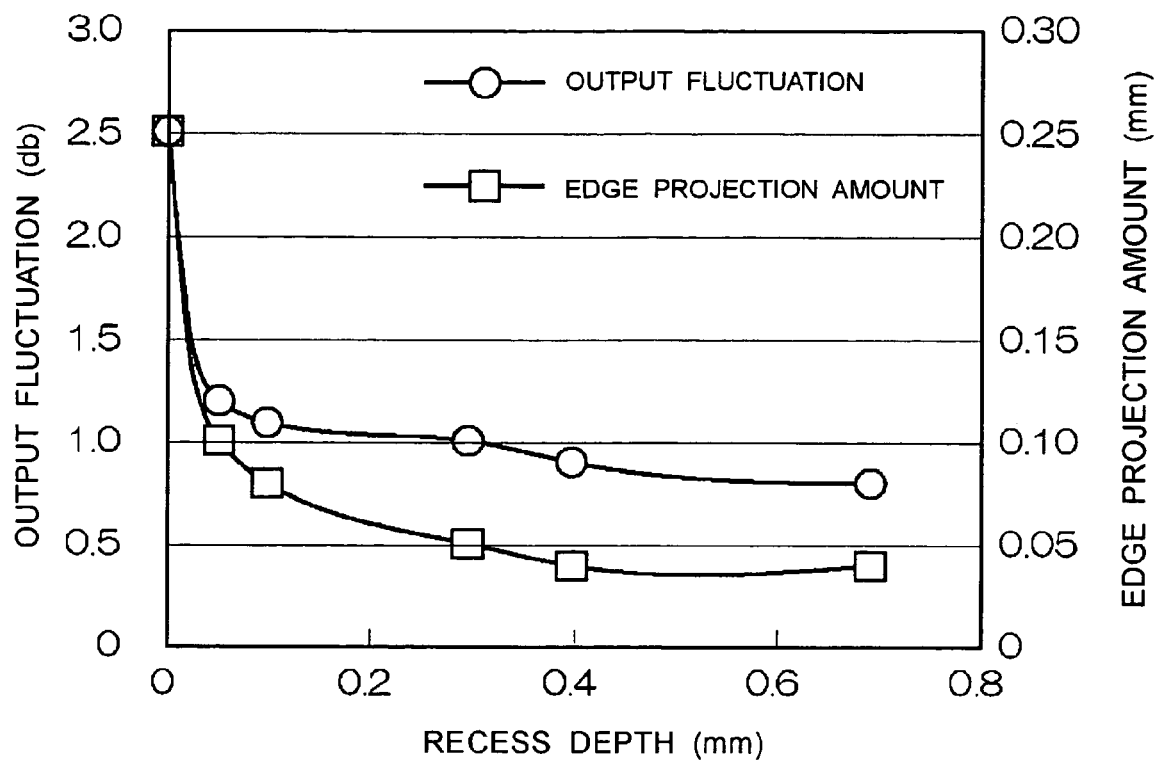
FIG. 9 is a graph showing the correlation between the depth of an air escape recess portion and the output fluctuation and so on of the magnetic tape.

FIG. 9 shows the relation of the depth of the air e escape recess portions provided on the inner surface side of the reference flange to the amount of edge projection of the magnetic tape and the output fluctuation. There was changed only the depth of the air escape recess portions within a range of 0 mm to 0.7 mm with the occupation area of the air escape recess portions made constant at 60% using the tape reel of Example 14 as a basic form.

As is apparent from FIG. 9, it can be understood that the amount of edge projection is large and the output fluctuation is large when the depth of the air escape recess portions is 0 mm, i.e., when no air escape recess portion is provided. On the other hand, it can be understood that the amount of edge projection is reduced and the output fluctuation is reduced when the air escape recess portions of which the depth is not smaller than 0.05 mm are provided. It is noted that the effect of reducing the edge projection amount and the output fluctuation is saturated when the depth of the air escape recess portions is not smaller than 0.40 mm. Moreover, the strength of the reference flange is reduced when the depth of the air escape recess portions are extremely large, and therefore, the depth of the air escape recess portions should preferably be not smaller than 0.05 mm and not greater than 0.40 mm.

Figure 10:
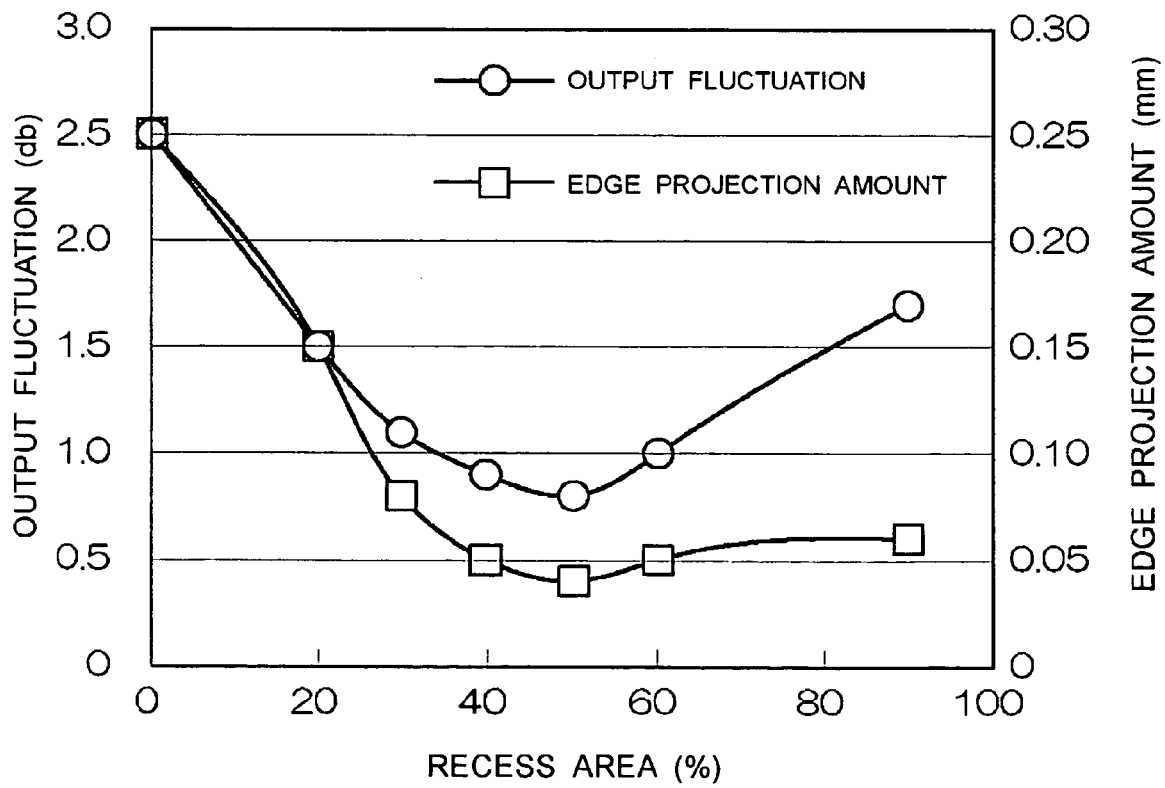
FIG. 10 is a graph showing the correlation between the occupation area of the air escape recess portion and, the output fluctuation and so on of the magnetic tape.

FIG. 10 shows the relation of the occupation area of the air escape recess portions provided on the tape receiving surface of the reference flange to the amount of edge projection of the magnetic tape and the output fluctuation. In FIG. 10, the depth of the air escape recess portions was fixed to 0.3 mm, and only the occupation area of the grooves was changed within a range of 0% to 90% using the tape reel of Example 14 as a basic form.

As is apparent from FIG. 10, it can be understood that the amount of edge projection is large and the output fluctuation is large when the occupation area of the air escape recess portions is 0%, i.e., when no recess portion is provided. On the other hand, it can be understood that the amount of edge projection is reduced and the output fluctuation is improved when the occupation area of the air escape recess portions is not lower than 30%. When the occupation area of the. air escape recess portions exceeds 80%, the output fluctuation is increased although the edge projection is small. This is equivalent to a situation in which ribs are formed projected on the tape receiving surface. It is considered that the tape edge on the reference flange side is damaged and the output fluctuation is increased as a result. According to the results of FIG. 10, the occupation area of the air escape recess portions should preferably be not lower than 30% and not higher than 80% and more preferably be not lower than 40% and not higher than 60%.

Figure 11:
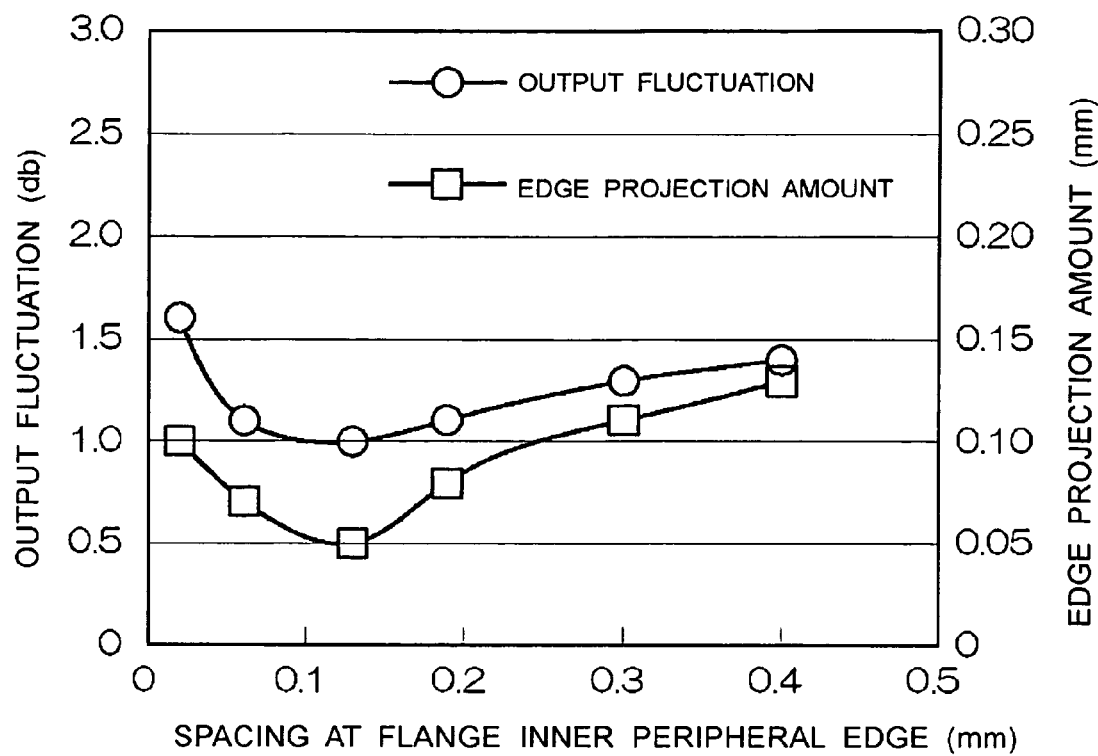
FIG. 11 is a graph showing the correlation between flange spacing and the output fluctuation and so on of the magnetic tape.

FIG. 11 shows the relation of the dimension of difference between the spacing H1 between both the flanges at the flange inner peripheral edge and the width dimension of the magnetic tape to the amount of edge projection of the magnetic tape and the output fluctuation. In FIG. 11, only the dimension of difference between the spacing H1 between both the flanges at the flange inner peripheral edge and the standard value of the width dimension of the magnetic tape was changed within a range of 0.02 mm to 0.40 mm using the tape reel of Example 14 as a basic form.

As is apparent from FIG. 11, when the difference between the spacing H1 between both the flanges at the flange inner peripheral edge and the width dimension of the magnetic tape is 0.02 mm, the output fluctuation is somewhat large although the edge projection is small. This is because the output fluctuation is sometimes increased as a consequence of the occurrence of edge breaking of the tape when the difference between the spacing H1 and the standard width dimension of the magnetic tape is extremely small. When the difference between the spacing H1 and the width dimension of the magnetic tape is set not smaller than 0.06 mm, the amount of edge projection is small, and the output fluctuation is small. It becomes difficult to obtain an orderly winding effect when the difference between the spacing H1 and the width dimension of the magnetic tape exceeds 0.30 mm. Moreover, in excess of 0.30 mm, the difference between the spacing H2 between both the flanges at the outer peripheral edge of the tape reel and the width dimension of the magnetic tape becomes excessively large, and therefore, the difference should preferably be not smaller than 0.06 mm and not greater than 0.30 mm.

Figure 12:
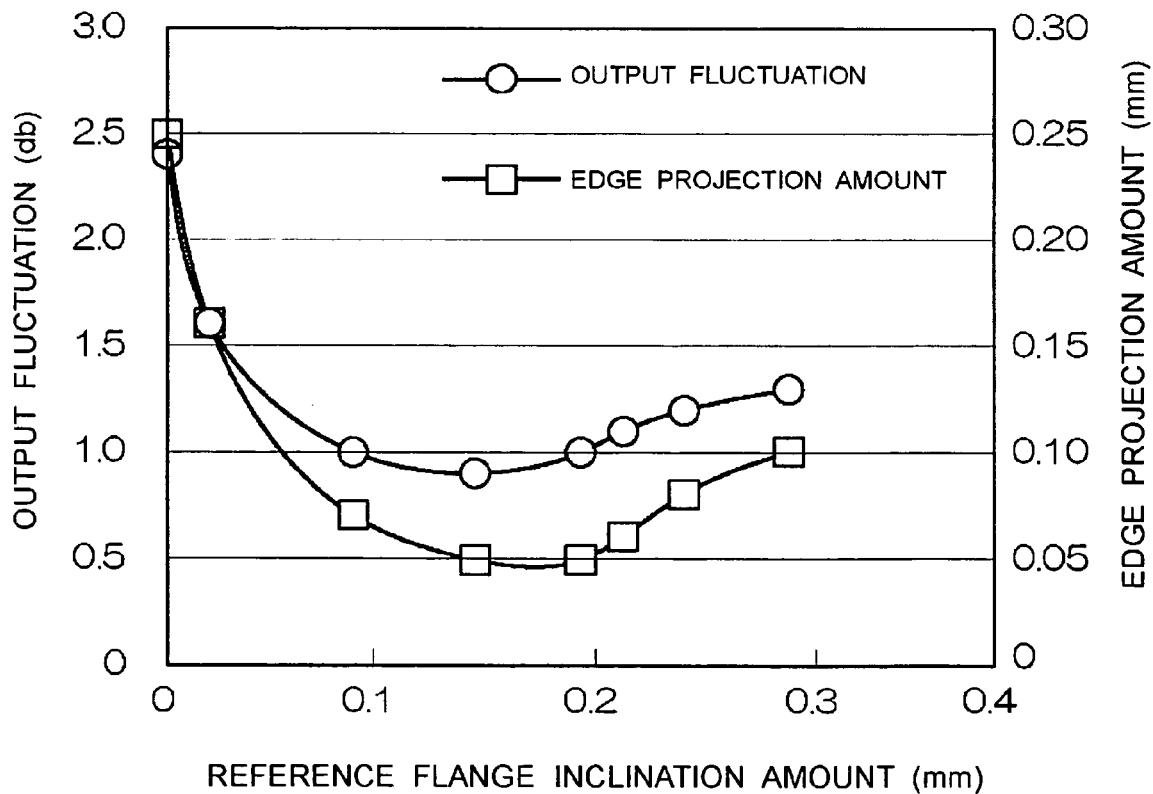
FIG. 12 is a graph showing the correlation between the degree of inclination of a tape receiving surface and the output fluctuation and so on of the magnetic tape.

FIG. 12 shows the relation of the degree of inclination of the tape receiving surface of the reference flange to the amount of edge projection of the magnetic tape and the output fluctuation. In FIG. 12, only the dimension "a" of the tape receiving surface located on the reference flange side was changed within a range of 0.0 mm to 0.30 mm using the tape reel of Example 14 as a basic form.

As is apparent from FIG. 12, the amount of edge projection and the output fluctuation are large when the dimension "a" of the tape receiving surface is zero, i.e., when the tape receiving surface is not inclined. This is presumably ascribed to the occurrence of the edge projection due to a minute tensional fluctuation when the reference flange side is horizontal. When the tape receiving surface is inclined even a little (0.02 mm in FIG. 12), the amount of edge projection is reduced and the output fluctuation is reduced. When the dimension "a" of the tape receiving surface is within a range of 0.05 mm through 0.25 mm, the amount of edge projection and output fluctuation is further reduced. Therefore, it can be understood that the amount of inclination of the reference flange (dimension "a") should preferably be not smaller than 0.05 mm and not greater than 0.25 mm.

Figure 13:
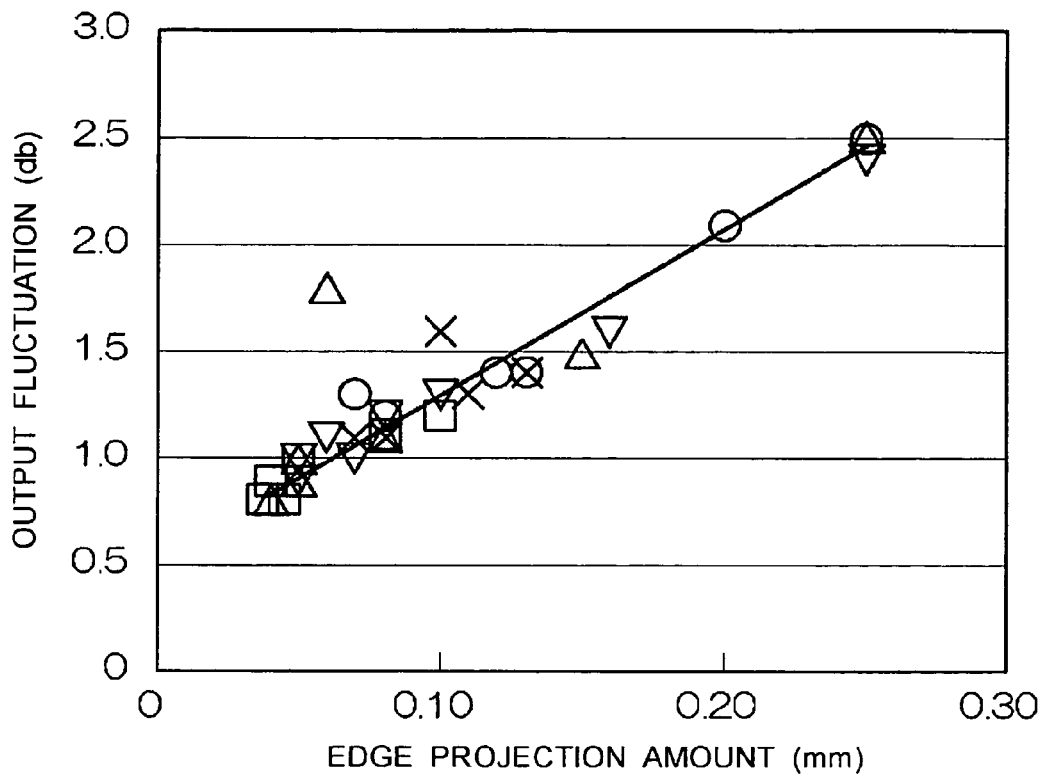
FIG. 13 is a graph showing the correlation between the amount of edge projection of the magnetic tape and the output fluctuation.

FIG. 13 shows the relation of the amount of edge projection (edge projection amount 2) after one reciprocative continuous run by the DLT4000 drive to the output fluctuation with regard to the magnetic tape cartridge used for the evaluations of FIGS. 5 through 9. As is apparent from FIG. 13, the output fluctuation becomes smaller as the amount of edge projection becomes smaller.

Figure 14:
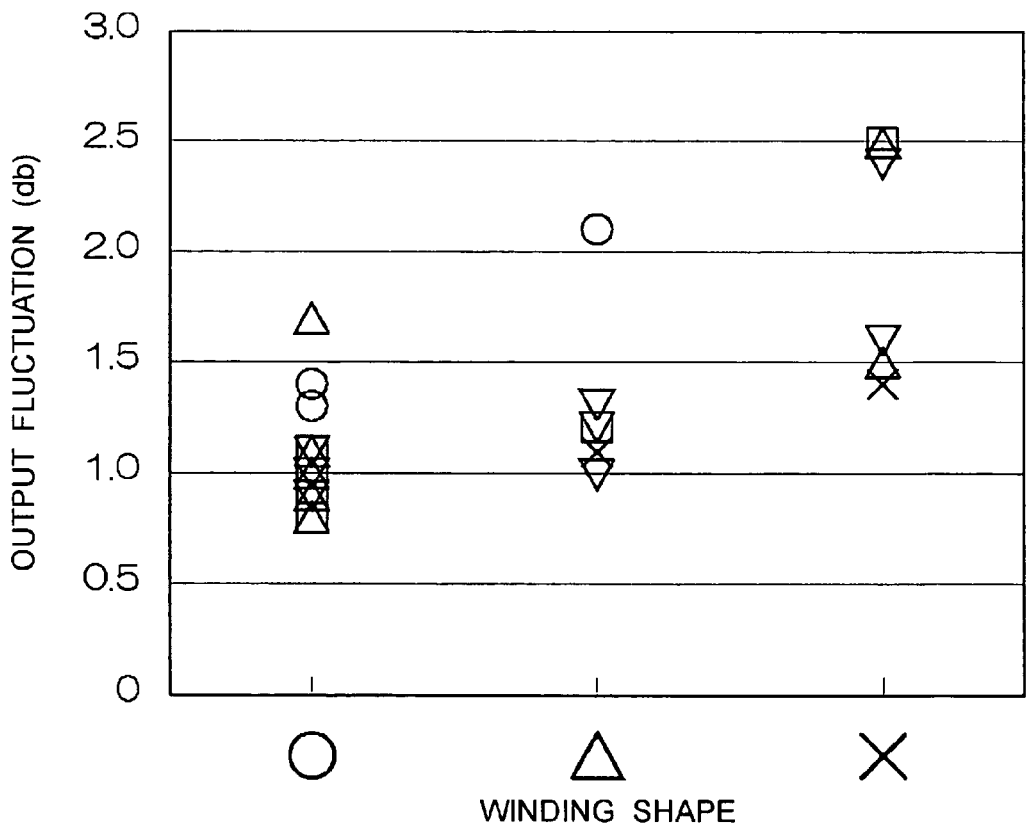
FIG. 14 is a graph showing the correlation between the magnetic tape winding shape and the output fluctuation.

FIG. 14 shows the relation of the winding shape (winding shape 2) after one reciprocative continuous run by the DLT4000 drive to the output fluctuation with regard to the magnetic tape cartridge used for the evaluations of FIGS. 5 through 9. As is apparent from FIG. 14, although the winding shape and the output fluctuation have some correlation, it is sometimes the case where the output fluctuation is large though the winding shape is good or the case where the output fluctuation is small though the winding shape is bad, meaning that the correlation is inferior to that of FIG. 13.

The present invention is intended for all the tape reels applied to the magnetic tape cartridge of the servo tracking system and for all the magnetic tape cartridges housing the tape reels without regard to the structure of the main body casing and the difference in the form of drawing out the magnetic tape. The invention can be equally applied also to the magnetic tape cartridges of different standard width dimensions and thickness dimensions of the magnetic tape. Moreover, it is significant to preparatorily load a magnetic tape cartridge with a built-in empty single reel around which no magnetic tape is wound into a magnetic recording and reproducing apparatus (tape drive) and prevent the occurrence of edge projection when performing recording and reproduction by winding up the magnetic tape around the empty single reel. The present invention can also be applied to the magnetic tape cartridge with a built-in empty single reel.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A tape reel for use with a single-reel magnetic cartridge of a servo tracking system in which signal recording and reproduction are performed while executing tracking control of a magnetic head array according to a servo signal recorded in advance along with a longitudinal direction of the magnetic tape, comprising:
    a cylindrical hub having a longitudinal axis and opposed first and second ends; and
    a first flange and a second flange extending radially outwardly from the first and second ends of the hub, respectively, so that a tape can be wound around the hub between the first and second flanges;
    the first flange having an inner surface opposing the second flange and an outer surface away from the second flange, the inner surface of the first flange serving as a reference position for receiving one longitudinal edge of the tape during a winding of the tape;
    the second flange having an inner surface opposing the first flange and an outer surface away from the first flange;
    the first flange having an average thickness larger than that of the second flange;
    the inner surface of the first flange being inclined outwardly from an inner peripheral end toward an outer peripheral end thereof so that an opposing distance between the opposed inner surfaces of the first and second flanges increases in proportion to a radial distance from the hub;
    the inner surface of the first flange having a plurality of recesses formed thereon, each of the recesses having a depth not smaller than 0.05mm and not greater than 0.40mm; and
    a total area of the recesses on the inner surface of the first flange occupying not lower than 30% and not higher than 80% of a total area of the inner surface of the first flange.

2. The tape reel of claim 1, wherein
    the first and second flanges define an innermost opposing distance between the inner peripheral end of the first flange and an inner peripheral end of the second flange, the innermost opposing distance being determined so that a difference between the innermost opposing distance and a transverse width of The tape is not smaller than 0.06mm and not greater than 0.30mm,
    an inclination of the inner surface of the first flange is determined so that a gap between a plane extending perpendicularly to the longitudinal axis, of the hub through the inner peripheral end of the inner surface of the first flange and the outer peripheral end of the inner surface of the first flange is not smaller than 0.05mm and not greater than 0.25mm.

3. The tape reel of claim 1 or 2, wherein
    the average thickness of the first flange is greater than that of the second flangeby not smaller than 0.02mm and not greater than 0.25mm.

4. The tape reel of claim 3, wherein
    the inner surface of the second flange is inclined outwardly from an inner peripheral end toward an outer peripheral end thereof so that an outermost opposing distance between the outer peripheral ends of the first and second flanges is greater than the innermost opposing distance between the inner peripheral ends of the first and second flanges by not smaller than 0.10mm and not greater than 0.45mm.

5. The tape reel of claim 4, wherein each of the first and second flanges has a substantially constant thickness from the inner peripheral end to the outer peripheral end.

6. The tape reel of claim 4, wherein
    the outer surface of the first and second flanges are substantially parallel to each other.

7. A magnetic tape cartridge for housing the tape reel of claim 1.

* * * * *